(12) United States Patent
Alles et al.

(10) Patent No.: US 6,952,728 B1
(45) Date of Patent: Oct. 4, 2005

(54) PROVIDING DESIRED SERVICE POLICIES TO SUBSCRIBERS ACCESSING INTERNET

(75) Inventors: Anthony L. Alles, Sunnyvale, CA (US); Arthur Lin, San Ramon, CA (US); Shyam Prasad Pillalamarri, Palo Alto, CA (US); Kent H. Headrick, Milpitas, CA (US); David A. Mullenex, Foster City, CA (US); Suhas A. Shetty, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/600,054

(22) PCT Filed: Dec. 1, 1999

(86) PCT No.: PCT/US99/28292

§ 371 (c)(1),
(2), (4) Date: Nov. 9, 2000

(87) PCT Pub. No.: WO00/33204

PCT Pub. Date: Jun. 8, 2000

(51) Int. Cl.[7] .......................................... G06F 15/173

(52) U.S. Cl. ...................................... 709/224; 709/226

(58) Field of Search ............................... 709/219, 225, 709/224, 244, 245, 230–237, 223, 226, 229; 370/235, 230, 230.1

(56) References Cited

U.S. PATENT DOCUMENTS

| | | | |
|---|---|---|---|
| 5,956,637 A * | 9/1999 | Ericsson et al. | 455/432.3 |
| 6,167,445 A * | 12/2000 | Gai et al. | 709/223 |
| 6,249,815 B1 * | 6/2001 | Foladare et al. | 709/223 |
| 6,405,191 B1 * | 6/2002 | Bhatt et al. | 707/73 |
| 6,466,976 B1 * | 10/2002 | Alles et al. | 709/224 |
| 6,502,093 B1 * | 12/2002 | Bhatt et al. | 707/3 |
| 6,542,593 B1 * | 4/2003 | Bowman-Amuah | 379/201.03 |
| 6,633,563 B1 * | 10/2003 | Lin et al. | 370/389 |
| 6,714,519 B2 * | 3/2004 | Luzzatti et al. | 370/252 |
| 2002/0029260 A1 * | 3/2002 | Dobbins et al. | 709/219 |

* cited by examiner

Primary Examiner—Glenton B. Burgess
Assistant Examiner—Kimberly Flynn
(74) Attorney, Agent, or Firm—Blakely Sokoloff Taylor & Zafman

(57) ABSTRACT

An internet service node (ISN) enabling the provision of desired service policies to each subscriber. The ISN may contain multiple processor groups, with each subscriber being assigned to a processor group. The assigned processor group may be configured with the processing rules, which provide the service policies desired, by a subscriber. A port may determine the specific processor group to which received data is to be forwarded. A content addressable memory with masks for individual locations may be implemented to quickly determines the processor group to which received data is to be assigned to. Due to the features of the present invention, an ISN may be able to serve a large number of subscribers efficiently. The ISN may be used at the edge of an access network.

44 Claims, 10 Drawing Sheets

| SRC | DST | SVC | ACTION | |
|---|---|---|---|---|
| SUBs A OR OFFICE 1 | OFFICE 1 OR SUBs A | IMAP | ACCEPT, ENCRYPT 3xDES | 610 |
| SUBs A OR OTHER OFFICES | OTHER OFFICES OR SUBs A | HTTP SMTP TELNET | ACCEPT ENCRYPT DES | 620 |
| ANY | SUBsA-WEB-SRVR | HTTP | ACCEPT | 630 |
| ANY | SUBsA-MAIL-SRVR | SMTP | ACCEPT | 640 |
| SUBs A-SUBNETS | ANY | ANY | ACCEPT | 650 |
| ANY | ANY | ANY | DROP & LOG | 660 |

*FIG. 6A*

| SRC | DST | SVC | TIME | TOS | WHERE | LINE COND | ACTION | |
|---|---|---|---|---|---|---|---|---|
| ANY | ANY | ANY | ANY | ANY | SUBsA LINK-IN | PEAK<1MBPS SUST.<500K | TOS=SAME | 680 |
| ANY | ANY | ANY | ANY | ANY | SUBsA LINK-IN | ANY | TOS=TOS-3 | 690 |

*FIG. 6B*

PROVIDING DESIRED SERVICE POLICIES TO SUBSCRIBERS ACCESSING INTERNET

BACKGROUND OF THE INVENTION

1. Field of the Invention

The present invention relates generally to digital communication networks, and more specifically to a system and method for providing desired service policies to subscribers accessing the Internet.

2. Related Art

Users often access remote systems using local systems. In a typical scenario, a user may use a computer system (generally located close-by) to access a remote system (generally at a distant location). The access can serve as a basis for several useful applications such as web browsing, electronic mail and data base accesses as is well known in the relevant arts.

Remote access devices often exist between local systems and remote systems. A remote access device generally operates as an aggregator (concentrator) or multiplexor of physical connections (e.g., dialed connections over local loops and dedicated T1 lines from large groups) originating from users. The remote access devices generally operate to send digital data bits ("bit groups") destined for the users, and receive bit groups originating from the users. Remote access servers (supporting digital and/or digital modems) provided by internet service providers (ISPs), digital subscriber line access multiplexors (DSLAMs) provided by local exchange carriers (conventional and competitive LECs), and cable modems provided by cable television providers are examples of such remote access devices.

A remote access device commonly interfaces with a data switch, which selectively forwards each received bit group to a corresponding destination, typically based on address information encoded in the bit groups. In a common implementation, a data switch corresponds to an Internet Protocol (IP) router, which examines the destination address of an IP packet to determine the next point (typically another router or computer system) to send the IP packet to.

In a conventional implementation, combination of routers and remote access devices may not serve particularized requirements (or desired service policies) of users. A group of users (including the case of a single user) having specific service policy requirements will be referred to as a subscriber in the present application. Examples of particularized requirements of subscribers are first noted. Then, the inadequacy of conventional routers and remote access devices in meeting user requirements is described.

Subscribers may have particularized requirements for several reasons. For example, a subscriber containing a large group such as a business, and the business may wish to limit the aggregate bandwidth used by some or all of the users. Some other business may wish a virtual private network (VPN), having dedicated secure links between different distance locations perhaps for some users but not all. Yet another business may wish to restrict inbound access to certain types of applications (e.g., only web accesses, but not file transfers or telenet) or have different classes of service (COS's) for different applications.

On top of such requirements for large groups, individual users (subscribers) may have different requirements. These individuals may be part of a large business or home users. A user may wish to be allocated only 56 Kbps during some peak times (e.g., business hours when networks are typically more congested), and much higher bandwidth during other times. An ISP may wish to charge lower rates for such users.

In general, it should be appreciated that the users or subscribers can have varying and particularized service policy requirements.

Conventional combinations of data switches and remote access devices may be inadequate in serving a combination of such requirements for several reasons. For example, data switches may be implemented primarily as fast packet forwarding devices, albeit with limited prioritization and access control schemes. Asynchronous transfer mode (ATM) switches prioritizing traffic based on quality of service (QoS) and traffic parameters, and IP routers filtering data of only some applications are illustrative examples.

However, the architectures chosen for conventional data switches and/or remote access devices may not provide for customization of service policies for individual users/subscribers. For example, ATM switches forwarding cells may not have the ability to distinguish between individual users by the examination of a single cell. Data switches operating at higher layers (e.g., IP routers) may be designed to process packets uniformly, usually for attaining speed, and thus may not be designed to provide customized service policies to individual subscribers.

As noted above, such customization may be required in several instances. Therefore, what is needed is a flexible architecture which enables the provision of different customized service policies to different subscribers.

In addition to customization, it is generally necessary that the architecture scale to serve a large number of subscribers. Therefore, what is also needed is a flexible architecture which scales well to serve a large number of subscribers.

SUMMARY OF THE INVENTION

The present invention is related to an internet service node (ISN) which provides a desired set of service policies to each subscriber. The ISN is particularly useful for remote access providers such as ISPs and LECs (both incumbent and competitive). The access providers may use the ISN as an edge device of an access network and provide customized service policies to each subscriber.

An ISN in accordance with the present invention may contain multiple processor groups, with each subscriber being assigned to a processor group. A processor group may be provided, for example, as a packet service card. A processor group may be configured with the processing rules of all the assigned subscribers such that the processor group may provide custom service policies desired by any of the assigned subscribers.

A port in the ISN may be designed to determine the specific processor group to which received data is to be forwarded to based on the specific subscriber to whom received data relates to. A switch fabric may then forward the data to the determined processor group based on the determination of the port. The processor group may apply the processing rules related to the subscriber to provide the service policies desired by the subscriber.

As each processor group may need to be designed to serve only a subset of the subscribers (served by the ISN), the present invention may scale well to large and/or complex networking environments.

The present invention may be used at the edge of an access network to provide custom service policies desired by each subscriber. In an embodiment, the desired service policies may be specified using a configuration manager. The configuration manager may be either integrated with ISN or as a different unit.

The configuration manager may translate the service policies into a set of processing rules, with each processing rule containing a classifier and an associated action. The classifier generally specifies the data flow(s) and any conditions under which the action can be applied to a set of data bits transferred on the data flow(s). In the internet protocol (IP) environment, the source/destination IP addresses, source/destination ports and the protocol type field together generally define an IP data flow supporting a specific remote access application.

Conditions may include matching of a specific variable defining the service policy. For example, a service policy may specify that data bits be treated a specific way between 9 AM–5 PM, in which case TIME is a variable and the condition is TIME=9 AM–5 PM. As another example, data bits for a subscriber may be given lower priority if the aggregate bandwidth used by the subscriber is greater than T1, in which case BANDWIDTH is the variable and the condition is BANDWIDTH>T1.

Typically, most processing rules can be constructed statically from the specified service policies. However, some processing rules may need to be instantiated dynamically upon the occurrence of a specific event. For example, the IP address of a subscriber dialing-in to and relying on the access network for allocation of IP address, may not be available up-front. Accordingly, the ISN constructs the processing rules when the subscriber is allocated an IP address after successfully dialing in.

Thus, the ability of the present invention to dynamically instantiate processing rules enables an ISN to serve subscribers who may asynchronously access an access network, provides the ISN the ability to provide customized service policies to such subscribers also. In addition, as an ISN need not be configured with processing rules for inactive (i.e. not logged on) subscribers, the ISN may be used for serving a large number of subscribers.

As another example of dynamic instantiation of processing rules, in RealAudio type applications, new TCP (or UDP) connections may be initiated in the middle of an application session, and the new connections may have port numbers which cannot be determined beforehand. The port numbers are typically negotiated using control flows as is well known in the relevant arts. The ISN may be designed to examine packets in control flows and determine the required information, and construct new processing rules once the information is available.

An embodiment of ISN includes a plurality of processor groups, with each processor group again containing multiple processors. All flows for a subscriber may be dedicated for initial processing by one of the processor groups. When ATM cells are used as data bit groups, the channel identifiers can be used for assignment to individual processor group. Packets may be assigned to individual processors within a group in a weighted round-robin fashion for load balancing. Other resource allocation schemes or management policies can be used as well.

The processors processing the packets (to provide the desired services) may be provided as physical units separated from the access and trunk ports. The physical separation enables the number of processors and ports to be changed (increased or decreased) independent of each other. The resulting flexibility enables an architecture in accordance with the present invention to scale well to support a large number of subscribers.

As noted above, data related to each subscriber may be assigned to a processor group. An aspect of the present invention provides an efficient approach for assigning the data to a processor group. The assignment is described with reference to an IP packet received as a sequence of ATM cells.

The determination of the specific processor group to which an IP packet is to be forwarded may require the examination of the header data of the IP packet. Such is the case at least when cell data destined for multiple subscribers is received on a shared ATM virtual connection as all cells may contain the same VPI/VCI data. This scenario is commonly encountered when data destined to subscribers is received on a trunk port. In such a scenario, the processor group may be determined by examining the IP destination address located in the IP header.

However, in some situations data further inside the IP packet may need to be examined to determine the subscriber. For example, data related to a subscriber may be received on a specific call of a L2TP tunnel. In such a situation, a received packet may need to be examined for a UDP protocol type, a UDP port number specifying L2TP protocol, a tunnel ID and a Call ID specific to the subscriber.

The present invention enables such examinations to be performed efficiently by using a content addressable memory (CAM) having a search field, mask, and output field for each CAM location. The search field of each location may be configured to store the data identifying a subscriber, and the output field may be configured to store data identifying a processor or a group of processors capable of providing the desired service policies to the subscribers related to the CAM entry.

In addition, the mask for each CAM location may be setup for examination of the bits identifying the subscriber. As an illustration, when data for multiple subscribers is received on a shared ATM connection, a CAM location may be designed to examine only the destination IP address. On the other hand, when data for a subscriber is received on a L2TP tunnel, the mask field of the corresponding CAM location may be set up to examine several more bytes of data.

Thus, when a first ("header") cell of an IP packet is received, the header data is provided as an input to the CAM, and the output data identifies a suitable processor. As different CAM entries can have different masks, a matching entry can be found in a single CAM access. The output of the matching entry may either represents a processor (group) identifier or may lead to further accesses to determine the processor.

When the output data does not represent a processor identifier, in the embodiments described herein, the output data either contains an index into an IP table or indicates that additional CAM searches are required to determine a processor (group) identifier. The index is useful to minimize the number of CAM entries. The index may be used to select an entry from a table stored in a fast memory (e.g., SRAM), and the retrieved value may represent the processor identifier or processor group identifier. As an illustration, the CAM entry may examine only the first three bytes of an IP address by choosing an appropriate mask, and thus present a matching entry for 255 IP addresses. The additional access to the fast memory may provide the specific processor identifier.

Additional CAM searches are generally required when a CAM does not contain sufficient number of bits in the search field to identify a subscriber. For example, when subscriber data is received using a L2TP tunnel, it may be required to examine more number of bits than that available in a search field of a single CAM location. In such circumstances, some of the bits may be examined in a first search and the others in a subsequent search. Only if a match is detected for all the searches, a match is deemed to have occurred.

In an embodiment described in the present application, only two searches may be required. However, embodiments requiring additional approaches are contemplated to be within the scope and spirit of the present invention. The searches may be required depending on the formats for the protocols and the number of bits which need to be examined.

The above-noted features can be implemented in either access ports receiving cells from subscribers or trunk ports receiving cells destined for the subscribers in an embodiment of an ISN. The ISN may include multiple processor groups, with a single group typically being configured to process IP packets related to a subscriber. In addition, a switch fabric may be designed to assign cells to one of the groups based on the header of the received cells. Specifically, the VPI/VCI field may uniquely identify the processor group to process the cells received by the switch fabric.

Accordingly, a assignment logic of the present invention determines the processor group by using the CAM, and replaces a portion (e.g., VPI) of the cell header of all cells of the IP packet with the processor group identifier. The switch fabric may then assign all the cells related to an IP packet to the processor group identified by the cell header (VCI/VPI).

Therefore, the present invention enables desired service policies for individual subscribers by providing separate processing rules for each subscriber, and using the processing rules to process data bits received on different data flows from the subscribers.

An ISN in accordance with the present invention may scale well to serve a large number of subscribers as each subscriber may be assigned to a processor group to provide desired service policies.

The present invention is particularly suitable for remote access applications as an ISN can be provided as an edge device, which can control all application data flows to provide desired service policies for each using subscriber using a single ISN.

The present invention provides for easier management and lower cost of subscriber devices as the desired service policies can be implemented by a remote access service provider (without requiring intelligent device at the subscriber premises).

The present invention enables multiple subscribers to share the same ISN as the service policies of one subscriber may not generally affect the other subscribers.

The present invention is particularly useful for remote access providers serving subscribers who access remote access networks by dialing-in (or other asynchronous mechanism) as the subscriber policies can be dynamically added to the ISN for the subscribers.

The present invention enables a large number of subscribers to be served as the processing rules of subscribers can be instantiated dynamically and the ISN needs to be configured with the processing rules of only the active subscribers.

The present invention enables an ISN to scale well to serve a large number of subscribers as the number of processors can be increased and the computation load of processing packets can be distributed among the processors.

The present invention provides a flexible architecture to serve a large number of subscribers as the processors are physically separated from the ports used for transmission and reception of data, and as the number of processors can be change independent of the number of ports, and vice versa.

Therefore, the present invention provides for a quick and efficient method to assign cells forming an IP packet to a pre-specified processor or processor group by using a CAM with masks for individual locations.

The present invention provides for the determination of an identifier in a single CAM access as each location can be configured with a mask corresponding to the bits which need to be searched for the subscriber (related to the location).

The present invention minimizes the number of required CAM locations by using a single CAM location for a group of IP addresses, and using the output of the CAM access as an index to retrieve the processor or processor group identifier.

The present invention enables a switch fabric to quickly forward IP packets to corresponding processors by substituting the determined processor identifier for the VPI in the cells and by having the switch fabric use the VPI to assign the cells to the processors.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIGS. 6A and 6B are tables illustrating example processing rules providing desired service policies for a subscriber;

DETAILED DESCRIPTION OF THE PREFERRED EMBODIMENTS

1. Overview and Discussion of the Present Invention

An internet service node (ISN) provided in accordance with the present invention enables customized service policies to be provided to individual users or subscribers. The ISN may enable a network manager to specify a desired set of processing rules for each subscriber. When data is received, ISN may first determine the specific subscriber to whom the data relates to, and process the received data according to the processing rules corresponding to the subscriber.

As the related subscriber is first determined for the received data and only the processing rules corresponding to the subscriber may be applied to the data, the data may be processed efficiently without regard to the processing rules of other subscribers served by the ISN.

According to another aspect of the present invention, the processing rules corresponding to each subscriber may be assigned to a pre-specified processor or group of processors. Accordingly, the data related to each subscriber may be forwarded to the corresponding processor(s).

As each subscriber may be assigned to a different processor group, the present invention may scale well to service a large number of subscribers. In other words, a service provider may serve more subscriber by adding more processors.

The present invention is described below in further detail with respect to several examples for illustration. However, it should be noted that the invention can be implemented in several other environments, potentially with several variations. A method in accordance with the present invention is described first.

2. Method

Figure 1:
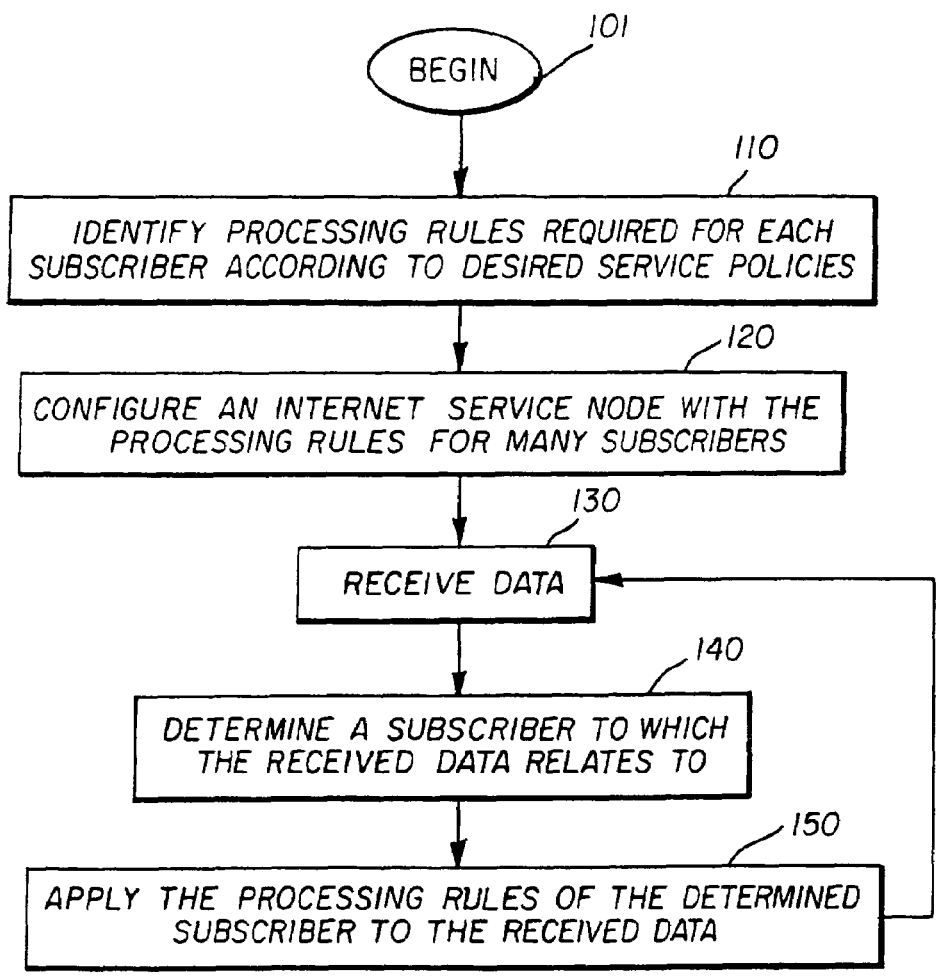
FIG. 1 is a flow-chart illustrating a method in accordance with the present invention.

FIG. 1 is a flow-chart illustrating a method in accordance with the present invention. In step 110, the processing rules required to provide desired service policies for each subscriber may be identified. A processing rule generally specifies the manner (e.g., discard, forward, prioritization, encryption, etc.) in which data is to be processed. In an embodiment described below, a processing rule may contain a classifier and an associated action. The classifier specifies the data bits (of the subscriber) to which the action is to be applied.

In step 120, an internet service node may be configured with the processing rules corresponding to several subscribers. The configuration mechanism is dependent on the implementation of the internet service node, and the implementation of several such mechanisms will be apparent to one skilled in the relevant arts at least based on the disclosure provided herein.

In step 130, an internet service node may receive data in the form of bit groups. In step 140, the internet service node may determine the subscriber to which the received data relates to by examining the bit groups. The determination of the specific subscriber again depends on the specific format employed for the bit groups. An example implementation with reference to asynchronous transfer mode (ATM) is described below in further detail. However, it should be noted that the present invention can be implemented in conjunction with other formats (such as frame relay, Ethernet) also as will be apparent to one skilled in the relevant arts based on the disclosure herein.

In step 150, the internet service node may apply the processing rules corresponding to the subscriber determined in step 130. The data is forwarded (or discarded) according to the processing rules. As the processing rules are designed to provide the service policies desired by the subscriber, an internet service node may provide service policies in accordance with the present invention. In addition, as an internet service node may be configured with the processing rules which are specific to each subscriber, differentiated services can be provided for each of the subscribers.

The present invention is described below in further detail with respect an example environment. However, it is helpful to understand the format of bit groups (particularly with respect to ATM), which may aid in determining the specific subscriber to which received data relates to.

3. Bit Groups

A bit group generally refers to a number of bits identifiable as a group. Different bit group formats may be used depending on the protocols to support different access methods. Multiple bit groups may form another bit group according to pre-specified conventions as is well known the relevant arts. As an example, data in several ATM cells may form an IP packet.

For purposes of illustration, the present invention is described substantially in the context of internet protocol (IP) packets transported as ATM cells. However, it should be understood that the present invention can be implemented with other protocols and transports as will be apparent to one skilled in the relevant arts. Such other implementations are contemplated to be within the scope and spirit of the present invention.

Each ATM cell contains 53 bytes of data, of which 5 bytes are used as header and 48 bytes are used as payload (actual application data using ATM networks). The header contains virtual path identifier (VPI) and virtual channel identifier (VCI) fields, which defines a channel. The next node in the connection path is typically defined when the channel is setup by a suitable signaling scheme. For a detailed understanding of ATM, the reader is referred to a book entitled, "ATM: Theory and Application". (ISBN: 0070603626, Published September 1994 by McGraw-Hill Series on Computer Communications), by David E. McDysan and Darren L. Spohn, which is incorporated in its entirety herewith.

Some times an ATM cell may be identified with a subscriber by examining the VPI/VCI fields (and the port number on which the cell is received). However, many times, individual ATM cells do not contain the information necessary to identify the associated subscriber accurately for providing customized service policies. As should be understood, an ISN may thus need to examine the higher level protocols to determine the subscriber service policies according to which the cells may need to be processed.

Accordingly, the payload of the ATM cells may be assembled to form a packet of the higher level protocol (IP protocol in our example). The assembled packet may then be examined to determine the subscriber to which the data relates to, and the processing rules specific to the subscriber are applied to the packet. The considerations in the examination of the higher protocol packets are described below with reference to IP environment.

4. Identifying Subscribers and Related Protocol (IP) Packets

The manner in which service policies can be associated with packets related to individual subscribers will be apparent by understanding the manner in which packets relate to remote access applications as described below.

Each typical remote access application requires a connection containing data flows in at least two directions. A data flow commonly refers to a sequence of IP packets from a source system to a destination system for supporting an application. In the IP environment, applications are typically identified by TCP or UDP ports, which are generally pre-specified or negotiated to identify the relationship with an application. Source and destination port numbers are typically used. The protocol type (TCP, UDP or ICMP), the port numbers along with the source and destination IP addresses, define an IP flow.

Some application-specific sessions employ more than the two flows, and possibly multiple connections. All flows related to an application session define a conversation. In IP environment, conversations are generally implemented on top of TCP (transmission control protocol), UDP (user datagram protocol), and ICMP (Internet control message protocol) protocols as is well known in the relevant arts. A conversation may contain multiple data flows depending on the application. For example, applications such as file transfer protocol (FTP) and RealAudio employ multiple flows, some times using a combination of higher layers (e.g., TCP vs. UDP in the IP fields).

TCP is the most common high level transport used by applications as TCP provides reliable stream of data using potentially unreliable IP packet transfer. A TCP connection generally contains two data flows, with the port numbers and IP addresses reversed. For example, assuming N1, N2, N3 and N4 respectively refer to the source IP address, source port number, destination IP address and destination port number for a data flow in one direction, the data flow in the other direction will have N2, N1, N4 and N3 for the same variables respectively. Multiple TCP connections may be used to implement an application.

In the case of UDP, the source ports generally are unpredictable when examined in the path between the two end systems. In the case of ICMP, the ports are replaced by type and identification fields.

From the above, it should be appreciated that each flow can be uniquely identified by the examination of the IP packet content. In addition, many types of applications use pre-specified port numbers (e.g., SMTP mail uses port 25), which can be used to identify the specific user applications if the processing rules are specified per user application.

In some instances, the port numbers used for flows in a conversation may be determined based on negotiations conducted on a 'control flow', typically setup on a pre-specified well-known port. For example, in multi-media (containing a combination of text, voice and video) application, multiple flows may be used for transferring digital data related to each multi-media component. A control connection is first initiated on a pre-defined port (e.g., port 200), and the ports for remaining flows are determined based on packet flows on the control connection. The port numbers for these new flows is encoded according to a pre-specified convention as is well known in the relevant arts.

Using at least the general formats and protocols illustrated above, an ISN may be implemented to provide desired service policies to each subscribers as described below in further detail. For illustration, an example environment in which the present invention can be implemented is described first. Example embodiments of the present invention are then described.

5. Example Environment

Figure 2:
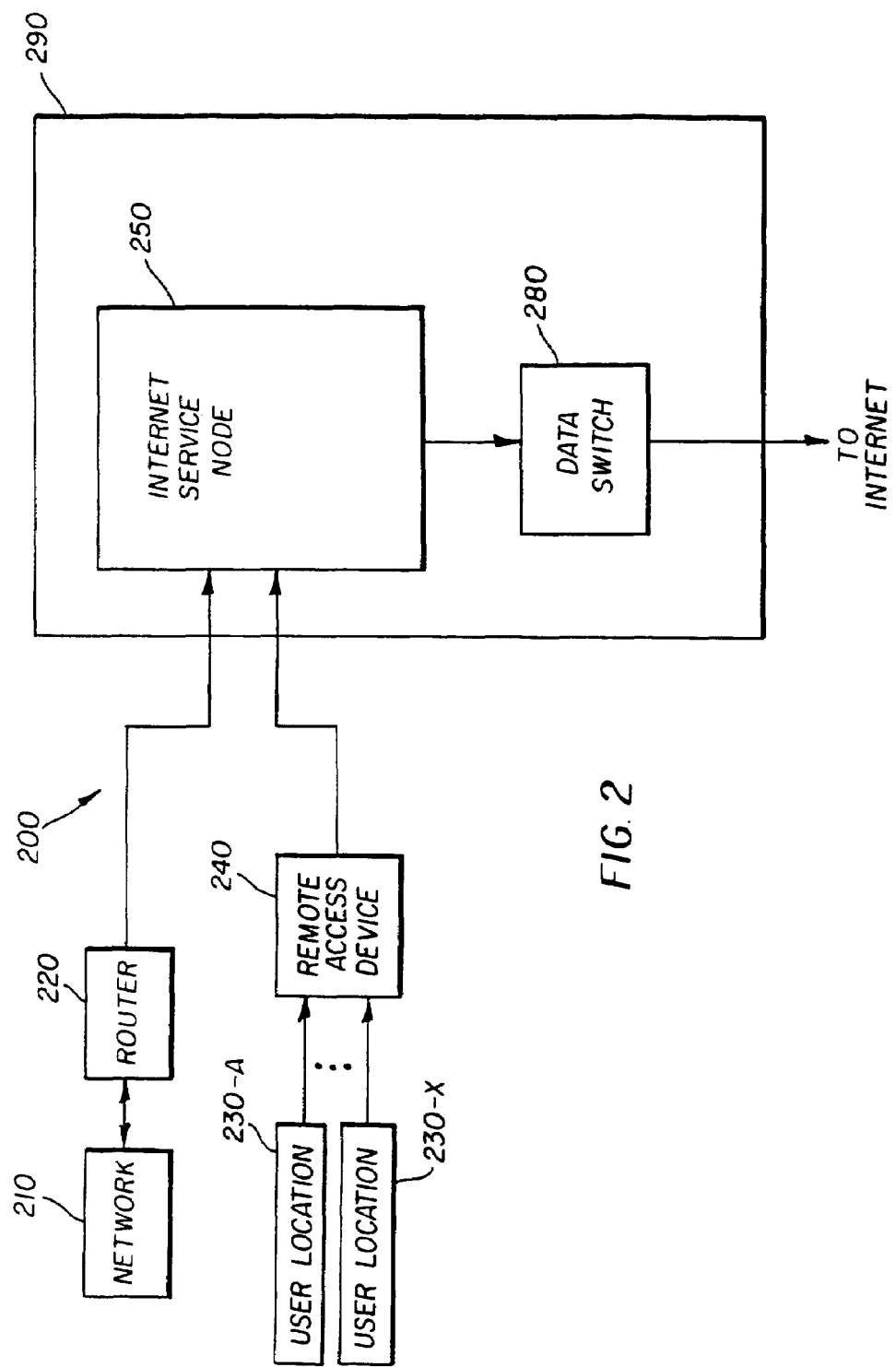
FIG. 2 is a block diagram of a telecommunication system illustrating an example environment in which the present invention can be implemented.

FIG. 2 is a diagram illustrating an example telecommunication environment 200 in which the present invention can be implemented. The Figure illustrates the manner in which ISN 250 can be used by a remote access service provider (e.g., internet service provider) to provide differentiated services to subscribers. User (subscriber) locations (210, 230-A and 230-X) interface with internet service node (ISN) 250 using different access technologies. ISN 250 is provided in access network 290. ISN 250 enables different desired service policies to be provided to different users in accordance with the present invention.

User network 210 may contain several systems connecting to router 220. User network 210 may be viewed as containing one subscriber or multiple subscribers. Router 220 may transfer data to ISN 250 as IP packets using protocols such as serial line interface protocols (SLIP) or point-to-point protocol (PPP). User location 230-A and user location 230-X are shown connected to remote access device 240, which may correspond to a remote access server (supporting analog and/or digital modems) or DSLAM implemented in a known way. Remote access device 240 may transfer data as IP packets segmented into ATM cells. Each location 230 may contain a single or multiple subscribers as described below.

It should be understood that the interfaces and subscriber locations of FIG. 2 are merely examples. ISN 250 may interface with different subscriber locations using different media and technologies without departing from the scope and spirit of the present invention as will be apparent to one skilled in the relevant arts. Such other implementations are contemplated to be within the scope and spirit of the present invention.

ISN 250 processes the data received on various interfaces in accordance with the present invention to provide desired service policies to different subscribers. Even though not shown, remote access device 240 may also be considered part of access network 290. Also, ISN 250 may interface directly with the Internet instead of relying on data switch 280. In general, data switch 280 may be needed if ISN 250 is not implemented including routing functionality.

The desired service policies are specified by or translated into processing rules, which indicate the manner in which data corresponding to different subscriber applications needs to be processed. To enable different bit groups to be correlated with different applications. ISN 250 may combine the bit groups into packets containing the necessary information. The processing rules are then applied to packets to provide the desired service policies. Data switch 280 may receive bit groups from ISN 250 and interface with other external systems in the Internet. Data switch 280 may correspond to an IP router. ATM or frame relay switch according to a pre-specified design.

As also shown in FIG. 2, ISN 250 has particular application for remote access service providers such as ISPs and LECs (incumbent or competitive). Because of the ability to provide desired service policies to various subscribers, ISN 250 of the present invention may be placed at the edge (i.e., interfacing with subscriber equipment) of remote access network 290. In such a case, ISN 250 may be referred to as an edge device, ingress/egress router or gateway.

As will be apparent from the description below, using ISN 250 at the edge enables subscriber equipment (e.g., router 220) to be implemented with less complexity, and thus to provide easier management and lower cost. Such a feature is particularly important for ISPs and LECs. Accordingly, FIG. 3 illustrates the manner in which the desired service policies can be provided to each subscriber.

6. Providing Differentiated Services Using an Edge Device

Figure 3:
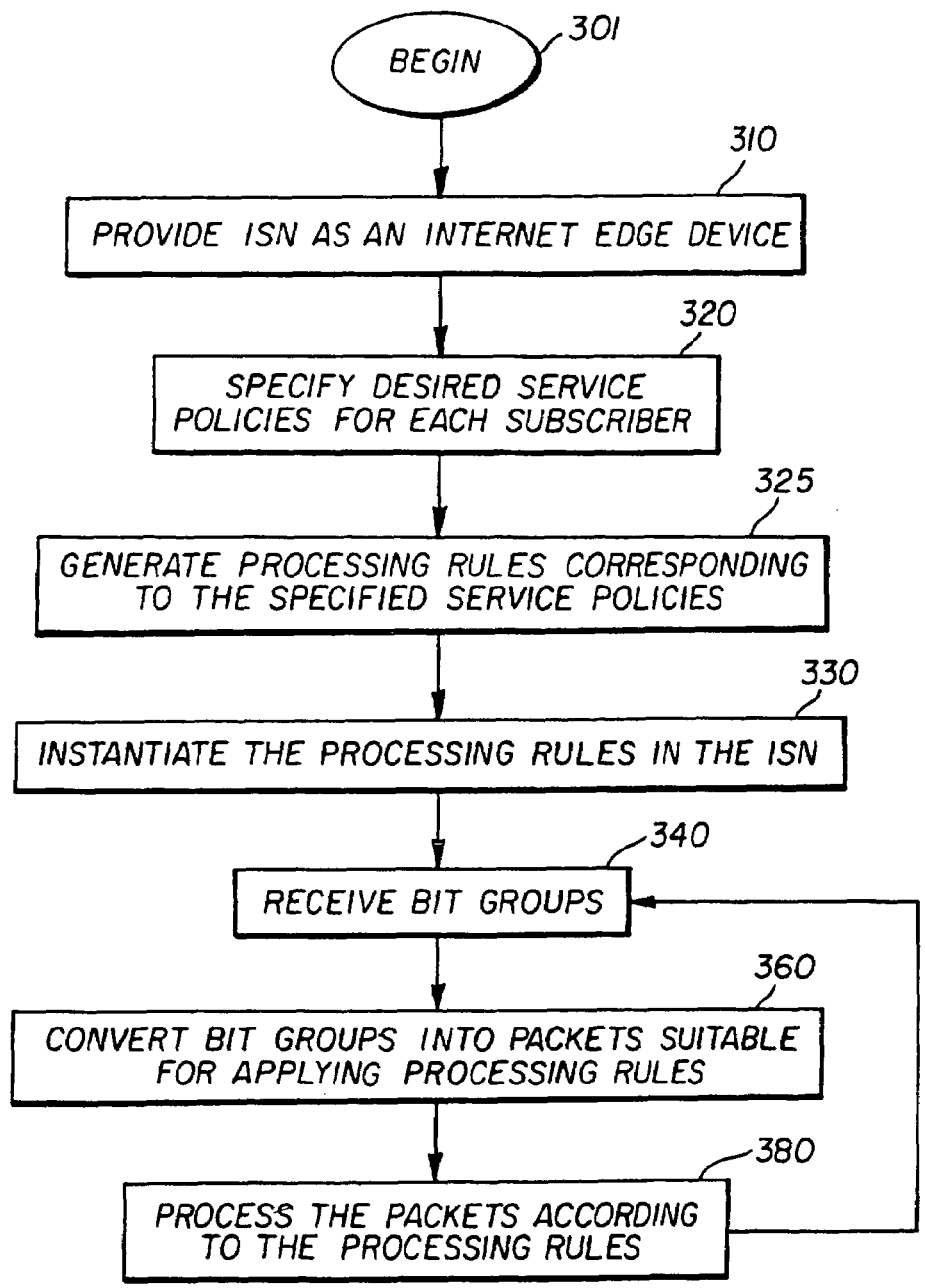
FIG. 3 is a flow-chart illustrating a method in accordance with the present invention using which a service provider may provide customized service policies desired by each subscriber.

FIG. 3 is a flow chart illustrating the manner in which a service provider may provide differentiated services to subscribers in accordance with the present invention. In step 310, ISN 250 of the present invention is provided as an edge device in the access network as depicted in FIG. 2. ISN 250 may be implemented as an IP router because of the wide-use of IP protocol by various systems.

In step 320, different service policies may be specified for each subscriber. The service policies may specify, for example, the aggregate bandwidth which can be used by a subscriber or some of the systems used by the subscriber, firewall parameters (which applications/IP addresses are permitted out/in), security (anti-spoofing, virtual private network with encryption and tunneling) for specified conversations, priority in usage of buffer and bandwidth (e.g., higher priority to interactive applications such as telenet), traffic steering, etc. Examples of specifying the service policies are described below in further detail.

In step 325, processing rules corresponding to the service policies may be generated. Each processing rule contains a classifier and associated action. The classifier specifies all the data flows and any conditions under which the associated action needs to be applied to the data on the data flows. In the IP environment, each data flow in turn may be uniquely identified by the protocol type, source/destination IP addresses and (TCP/UDP) source/destination ports. A classifier may specify multiple data flows.

Conditions may be specific to the type of service policy being implemented. For example, a subscriber may be permitted higher bandwidth during non-business hours. Another subscriber may have the data being given a lower priority if the data is destined to a specific subscriber during a specified time of day. Examples of the conditions are described in further detail below with reference to FIG. 6B.

Many processing rules may be generated up-front when the service policies are specified. However, for some processing rules, the necessary information may not be available up-front. In such a situation, rules are generated dynamically when the information is available. Some example scenarios for dynamic generation of processing rules are noted below.

One example scenario requiring dynamic generation of rules is when a subscriber uses a dial-up connection with access network 290 and relies on access network 290 to assign an IP address. For example, with respect to FIG. 2, user location 230-A may correspond to a personal computer using a modem. The IP address for a machine at user location 230-A may be assigned by an authentication-authorization-access (AAA) server (not shown in the Figures) when a user establishes a dial-up connection as is well known in the relevant arts. Assuming that the processing rules require an allocated IP address, the processing rule may be generated only after allocation of the IP address.

As another example, in the case of some applications, the data flows may be initiated in the middle of an application session, and the port information may be available only after the corresponding data flow is initiated. The port information is typically determined during negotiation between the two end systems, and the port information is generally contained in the packets serving as a basis for the negotiation.

Accordingly, ISN 250 may have to monitor the packets on some flows to determine the port number of other flows. ISN 250 may then use the determined information to generate the processing rules with classifiers and associated action.

In step 330, the processing rules are instantiated in ISN 250. Instantiation generally refers to making the processing rule active by proper configuration of ISN 250. Once instantiated, ISN 250 applies the processing rules to the corresponding subscriber data as described below in further detail.

It may be noted that some of the processing rules may be instantiated up-front, for example, at the earlier of when ISN 250 boots up or when the desired services are specified. Some other processing rules may be instantiated when generated as described above in step 325.

In step 340, ISN 250 may receive bit groups according to the specific interface provided to the subscriber equipment. In step 360, the bit groups are converted into packets suitable for applying processing rules. If the bit group contains sufficient data for applying processing rules, the bit group itself may be treated as a packet without conversion. For example, the bit groups correspond to a complete IP packet without fragmentation, no assembling may need to be performed. If the bit group is an ATM cell, payload of multiple cells may be combined (assembled) to form an IP packet.

Sometimes the data in multiple IP packets may in turn need to be combined into a single packet, typically when the IP packet is fragmented. Fragmentation may be performed, for example, to make individual IP packets size small to conform to maximum packet size allowed by an intermediate network in the connection path. The combined packet will also be referred to as a packet. In general, bit groups may be assembled multiple levels to determine whether subscriber data (received in the form of bit groups) matches a classifier.

In step 380, the packets are processed according to the processing rules provided per subscriber. That is, each packet is first associated with a subscriber, and the processing rules corresponding to the subscriber are applied. As is well known in the relevant arts, an IP address may be shared by multiple machines during remote access. Accordingly, the virtual channel number (e.g., VCI/VPI combination in ATM, DLCI in frame relay) may first identify a subscriber, and the processing rules associated with the subscriber may be applied to the packets received or sent on the channel.

Multiple subscribers may share a single channel identifier in some situations. For example, when a sub-group of network 210 is viewed as a subscriber, the subscribers of network 210 may share a single channel. In such a case, the IP addresses may be designed to be non-overlapping so that different flows are uniquely associated with different subscribers. Similarly, ISN 250 may receive packets destined for subscribers on a single channel. In such a situation, ISN 250 may need to examine the IP addresses and other information to associate a packet with a subscriber.

The processing rules may need to be applied in one of several possible orders to ensure predictable and desired service policies. In general, the processing determines whether/where/how and at what priority to forward the packet. To implement the processing rules, several 'states' may need to be maintained in ISN 250. For example, if a pre-determined aggregate bandwidth is allocated to multiple flows, the number of bits transferred for the multiple flows may need to be maintained for limiting the overall bandwidth. The data in the packet generally needs to be forwarded according to the interface provided with the next system in the connection path.

Thus, by applying the processing rules to different packets, the desired service features may be provided to each subscriber. The method of FIG. 3 may be implemented in several ISNs. An embodiment of ISN 250 is described below in further detail.

7. Internet Service Node

Figure 4:
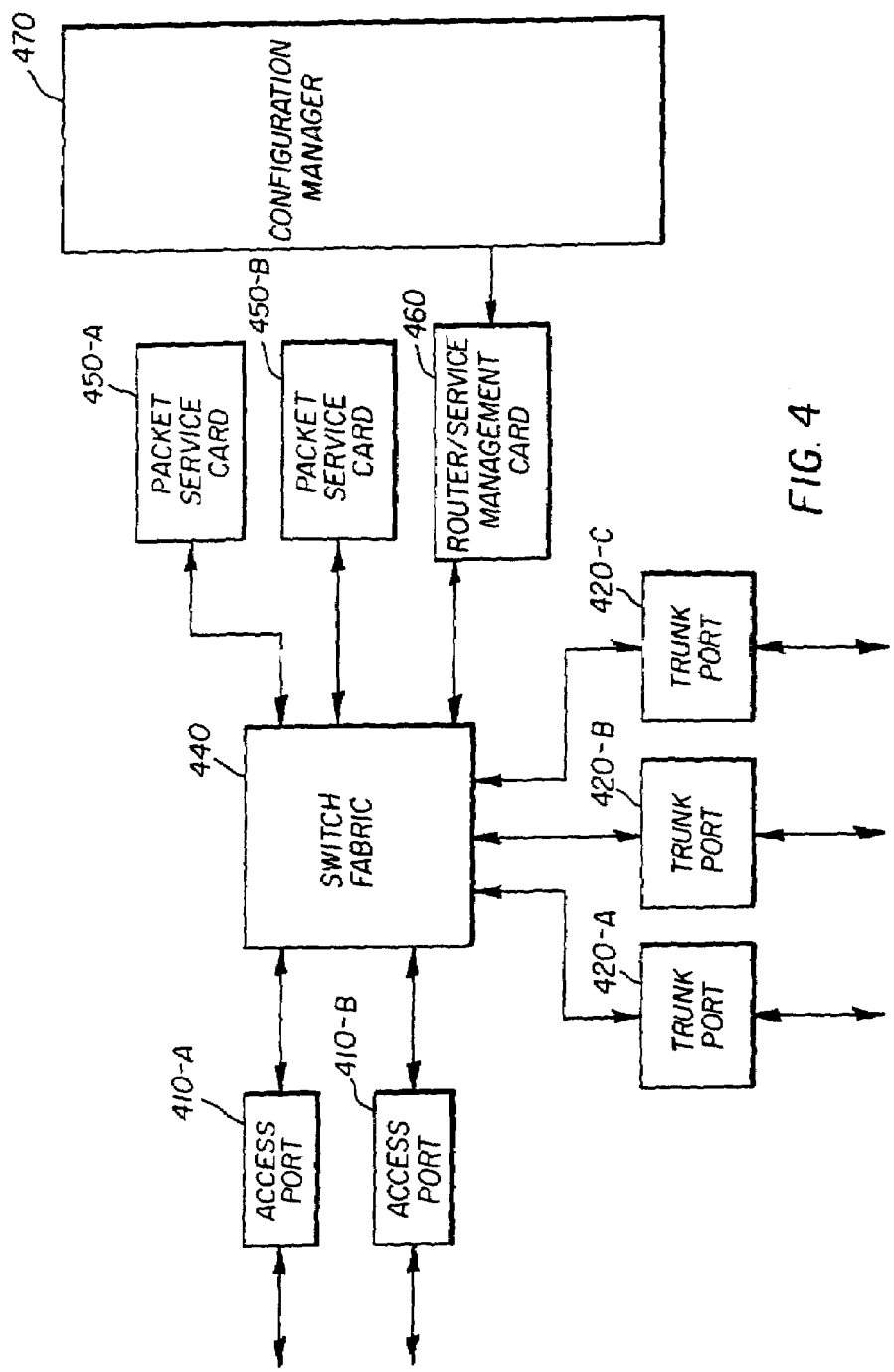
FIG. 4 is a block diagram of an embodiment of internet service node (ISN) provided in accordance with the present invention.

FIG. 4 is a block diagram illustrating the details of ISN 250 in one embodiment. ISN 250 may include access ports (410-A and 410-B), trunk ports (420-A, 420-B and 420-C), switch fabric 440, packet service cards 450-A and 450-B, route/service management card (RMC) 460 and configuration manager 470. Trunk ports 420-A. 420-B and 420-C will be collectively or individually referred to by 420 as will be clear from the context. Similar convention is used with reference to other components described in the present application.

It may be noted that packet service cards 450 are physically separated from ports 410 and 420. The physical separation enables the number of packet service cards 450 to be changed independent of the number of ports 410 and 420, and vice versa. Such a flexibility enables the ISN 250 to scale well to serve a large number of subscribers.

Access ports 410 provide the necessary physical interface to receive and send cells in a pre-specified format. Protocols such as Sonet may be used for high speed interface. For purposes of illustration, access ports 410 will be assumed to send and receive data in the form of ATM cells. Each subscriber port 410 forwards the ATM cells to switch fabric 440.

Trunk ports 420 provide high speed access lines for internet access to subscribers. Trunk ports 420 receive ATM cells (or other bit groups) from switch fabric 440, and forwards the cells on the corresponding lines as specified by the channel identifier (or other destination address). Similarly trunk ports 420 may receive data bit groups in the form of ATM cells or IP packets from the Internet and send the data bit groups to switch fabric 440. In this reception scenario, higher level protocol information (e.g., IP header) may need to be examined to determine the specific processor group to which the data is to be forwarded. Once the corresponding processor group receives the data, the data is examined to determine the specific subscriber to which the data relates to, and the corresponding processing rules are applied.

In an embodiment, multiple ports are provided on a line card and each port can be configured either as a trunk port or access port. The line cards can support different access technologies such as frame relay ATM, packet over Sonet, Fast Ethernet, Gigabit Ethernet.

Configuration manager 470 provides a convenient user interface to enable different service policies to be specified for different subscribers. The service policies determine the services provided to different subscribers. Configuration manager 470 may communicate various configuration parameters (as determined by the service policies) to RMC 460, and RMC 460 may in turn configure the different components to provide the service policies. In an embodiment, configuration manager 470 is implemented as a separate computer system, which interacts with ISN 250 according to a pre-specified protocol. In an alternative embodiment, configuration manager 470 may be integrated into ISN 250.

Configuration manager 470 may translate the service policies into processing rules when the information is available, and provide the processing rules to a corresponding packet service card 450. Packet service card 450 may instantiate the processing rules for the corresponding subscriber. For example, configuration manager 470 may interact with a authorization-authentication-access (AAA) server to determine when an IP address is allocated to a subscriber accessing the access network by a dial-in connection, and provides the processing rules corresponding to the subscriber to one of the packet service cards 450.

Route/service management card (RMC) 460 executes routing protocols such as Open Shortest Path First (OSPF), RIP, or BGP to determine the next hop (or forwarding information in general) for each IP packet. The routing protocols can be executed in known way. RMC 460 may provide forwarding information in the form of VCI/VPI information to identify the next hop of the IP packet.

In addition, RMC 460 may configure different components of ISN 250 to enable different features of the present invention. With respect to L2TP, RMC 460 may be designed to process the requests for setting up an L2TP tunnel and calls within the tunnel. RMC 460 may provide the call ID, tunnel ID and any other information necessary to the corresponding access/trunk port receiving data related to the tunnel. The access port may then use the information to assign IP packets received in the tunnel to a specific packet service card 450.

Switch fabric 440 receives bits groups from access ports 410, and forwards the received bit groups to packet service cards 450 upon receiving the data for an entire packet. If the data bits are received as ATM cells, the last cell for a packet may be determined according to AAL5 protocol well known in the relevant arts. Thus, all the cells forming a frame may be sent to an appropriate packet service card 450 once the data for a packet is available. Different service policy types may be implemented in different packet service cards 450. Accordingly, each subscriber (using the connection or subscriber identifier) may be assigned to a packet service card providing the desired service policy types.

To determine the appropriate packet service card, switch fabric 440 may maintain a channel identifier associated with each channel on which the bit groups are received. In case of ATM cells, the VCI/VPI information in the bit groups uniquely defines such a channel. The physical port number (on which the data is received) and channel identifier may uniquely identify each subscriber (or a group of subscribers with non-overlapping IP addresses) when data is directly received from a subscriber and destined for the Internet. On the other hand, when data is received from the Internet, the determination of the associated subscriber may require examination of the IP header. In general, switch fabric 440 may buffer the cells until a last cell of a packet is received, and forwards all the cells for the packet to a packet service card allocated for an individual subscriber.

Switch fabric 440 receives cells from access ports 410 and trunk ports 420, and forwards the cells to one of the packet service cards 450. Switch fabric 440 may forward the received cells to packet service cards 450 upon receiving the data for an entire packet. Switch fabric 440 may use a high speed random access memory (not shown in the diagrams) for buffering the cells while awaiting the arrival of the last cell. The last cell for a packet may be determined according to AAL5 protocol well known in the relevant arts. Thus, all the cells forming a frame may be sent to an appropriate packet service card 450 once the data for a packet is available.

Switch fabric 440 may receive packets from packet service cards 450 after processing according to the service processing rules, and send the received packets on one of the trunk ports 420. The specific trunk port 420 may be determined by associating a specific trunk line card 420 for each channel, which may also be identified by a channel identifier provided by packet service cards 450. Switch fabric 440 may convert the packets into cells prior to transmission on trunk line card 420.

Packet service cards 450 may be configured with many processing rules for each subscriber, with each processing rule containing a classifier and an associated action. The classifier generally specifies the data flow(s) and any conditions under which the action can be applied to a set of data bits transferred on the data flow(s) to achieve provide the service policies desired for each subscriber. In the internet protocol (IP) environment, the source/destination IP addresses, source/destination ports and the protocol type field together generally define an IP data flow supporting a specific remote access application.

Each packet service card 450 may be configured with the processing rules corresponding to a subscriber for one of several reasons. For example, by assigning the data processing for each subscriber to a specific packet service card 450, each packet service card 450 may need to be configured only with the processing rules corresponding to the subscribers assigned to it.

Multiple packet service cards 450 may be employed to scale well to large complex large environments. In addition, some of the packet service cards 450 may have specialized functionality for processing some types of subscriber data.

Packet service card 450 may first assemble the cell data into packets which can be identified with a subscriber. Once the subscriber is determined, the flow to which the packet relates to is determined, and the corresponding processing rules are applied. In the process, packet service card 450 may determine whether to discard or forward the packet. Packet service card 450 may process the received cells according to the processing rules for the subscriber to provide the desired service policies to each specific subscriber.

Packet service card 450 may determine the next hop for the packet based on the routing information provided by route management card 460 or the cell header associated with the incoming cells. A new VCI/VPI number is generated according to the next hop for all the cells to be generated from the processed packet. Packet service card 450 sends the cells with the new VCI/VPI number to switch fabric 440 for forwarding on appropriate trunk port 420.

Even though each subscriber is described as being assigned to a single packet service card 450, it should be understood that multiple packet service cards may process data related to single subscriber. Such a situation is typically present when one of the packet service cards is designed to provide specific specialized services for all/many subscribers, and other packet service card(s) is designed to provide the remaining services desired by the subscriber. In such a situation, the data processed by one of the service cards may be forwarded to another packet service card according to a pre-determined sequence using switch fabric. The processors in all such packet service cards may also be referred to as a processor group.

By applying the processing rules to each packet, packet service card 450 may enable ISN 250 to provide several features in accordance with the present invention. Several embodiments of packet service card 450 may be implemented without departing from the scope and spirit of the present invention. An example implementation is described below.

8. Packet Service Card

Figure 5:
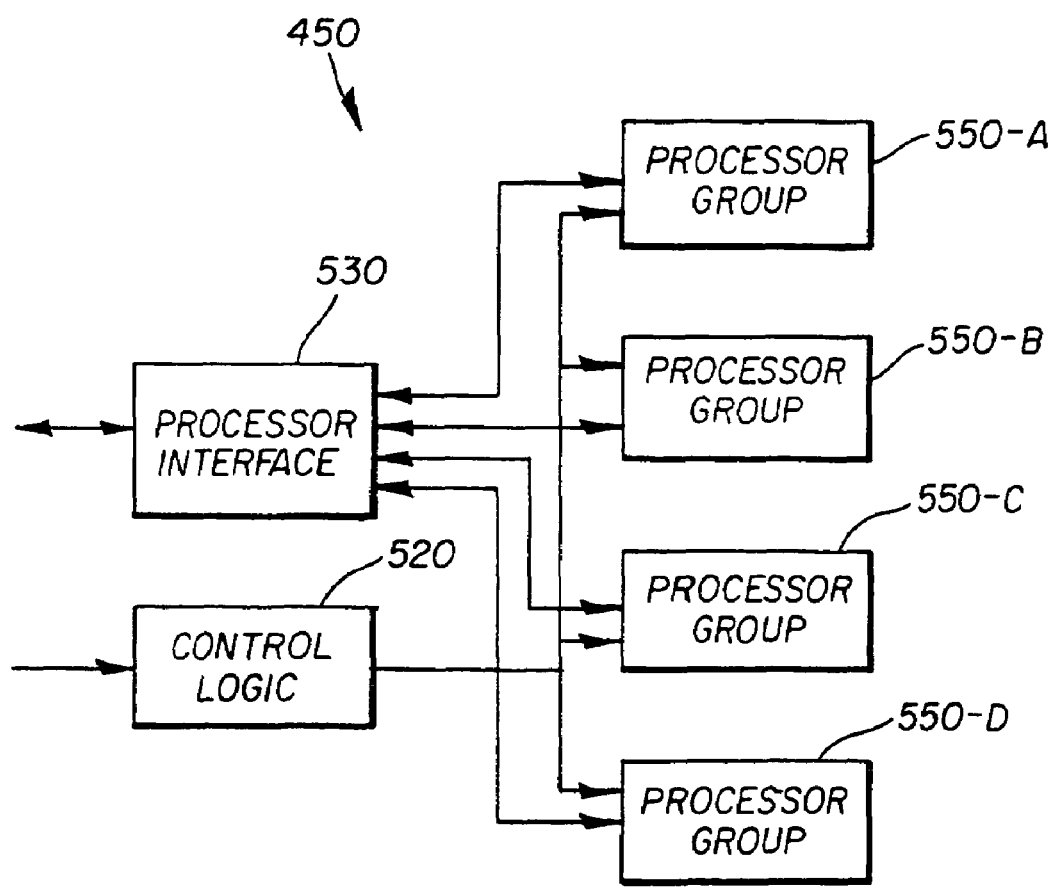
FIG. 5 is a block diagram of an embodiment of packet service card provided in an ISN in accordance with the present invention.

FIG. 5 is a block diagram illustrating the details of an embodiment of packet service card 450. Packet service card 450 may contain four processor groups (550-A through 550-D), processor interface (PIF) 530, and control logic 520. The operation of the each block is described below in detail.

Control logic 520 coordinates and controls the operation of other components in packet service card 450. Control logic 520 may determine which of the processors in a processor group may process a packet. In an embodiment, packets are assigned on a round robin basis among the four processors. Control logic 520 may operate in conjunction with configuration manager 470 to instantiate (configure) processor groups 550 with the processing rules related to assigned subscribers.

When implementation of a service policy requires dynamic instantiation of a processing rule based on examination of data transferred in the data flows, control logic 520 may examine the data flows and generate new processing rules. As an illustration, in H.323, voice-over-IP, or streaming applications, new connections or data flows may be dynamically created based on negotiations implemented in control flows. Control logic 520 may examine the control flows to determine any necessary information (e.g. port numbers) and create processing rules based on the examination. Control logic 520 may configure processor group 550 to ensure processor group 550 performs an operation specified by the processing rule. In turn, control logic 520 may be controlled due to a service policy specified using configuration manager 470.

PIF 530 may receive cells from switch fabric 440 and forward the cells (forming an IP packet) to one of the four processor groups 550. In an embodiment. PIF 530 may contain four input ports corresponding to the four processor groups, and switch fabric 440 may send the cells on one of the four ports (and thus to a specific processor group) as determined by the VCI header information. That is, the VCI header may determine not just the packet service card, but also the specific processor group for processing the received cells.

Several subscribers may be uniquely assigned to each processor group 550. RMC 460 may generate the necessary commands to configure each processor group 550 with the processing rules associated with the assigned subscribers. RMC 460 may determine which specific processor group 550 is to process data related to each subscriber, and configures the corresponding processor group with the processing rules associated with the assigned subscribers. The configuration commands may be issued via processor interface 530.

Each processor group 550 may contain several processors and an SRAM (not shown) for storing the cells related to a packet. The SRAM may be shared by all the processors contained in the processor group 550. All processors in a processor group 550 may be capable of processing data related to all the assigned subscribers. While a processor group may be determined by the channel identifier associated with the cells, the specific processor processing the packet may be determined by control logic 520.

As each subscriber may be assigned to a processor group 550, a service provider may service more subscribers by adding additional processor groups. Accordingly, solutions provided in accordance with the present invention scale well to large networks. In addition, a processor group may be designed to serve the specific policy requirements of a subscriber. For example, only processor group 550-B may be designed to provide virtual private networks (VPNs), and all the subscribers requiring VPNs may be assigned to processor group 550-B. Some example service policies are described below in further detail with reference to FIGS. 6A and 6B.

9. Examples of Service Policies

FIGS. 6A and 6B together illustrate example subscriber policies for a subscriber. For illustration, the packets are described as being processed according to a first match policy. However, other matching policies such as 'best match' may be used as will be apparent to one skilled in the relevant arts.

FIG. 6A illustrates how different policy rules can be specified to implement security. It is first noted that the classifier for security policy is chosen to merely include data required for identifying flows (no conditions). Service rule 610 specifies a classier of IP address= SubsA or Office 1, destination IP address=SubsA or Office 1. service=IMAP, and an action to encrypt matching data using 3×DES encryption protocol. That is, the mail exchanges between SubsA and Office 1 are to be encrypted using the specified protocol.

Two processing rules may be generated to implement service rule 610, with each rule having a classifier specifying one flow. In general, each processing rule may be generated as a five tuple with source IP address, destination IP address, protocol field (e.g., TCP or UDP), source port number, and destination port number.

At least some of the service rule parameters are readily available up-front and can thus be statically translated into corresponding processing rule parameters. Thus, assuming the IP addresses SubsA and Office 1 of service rule 610 are known beforehand, two processing rules may be generated from the service rule as the TCP port number for IMAP is pre-specified.

However, if one of the IP addresses (e.g., SubsA) is to be generated dynamically, for example as the user system needs to establish a dial-in connection, user interface 470 may dynamically generate the processing rules after the user is assigned an IP address. The processing rule may also be instantiated dynamically.

Service rule 620 attempts to accept and encrypt all HTTP. SMTP, and TELNET traffic from and to SubsA. Processing rule(s) may be generated for each of HTTP, SMTP, and TELNET. The protocol types and port numbers for these three applications are pre-specified, and accordingly processing rules may be generated statically assuming the IP addresses (for SubsA and other offices) are also known.

Service rule 630 accepts all HTTP traffic to SubsA-Web-Srvr. Service rule 640 accepts all smtp traffic with SubsA-Mail-Srvr. Service rule 650 accepts all traffic from SubsA-Subsets. Service rule 660 drops (discards) all other data and makes a log of the dropped data for later accounting and analysis. As may be readily appreciated, the approach of FIG. 6A can be used to implement security requirements specific to a subscriber. Different subscribers may have different policy rules to suit their individual needs.

In the approach of FIG. 6A, each classifier generally includes information necessary to identify flows. Classifier may include conditions specific to service policy as illustrated with reference to FIG. 6B, which illustrates service policy rules for policing in an embodiment. Policing generally refers to prioritization and allocation of bandwidth to different connection sharing available bandwidth.

Service rule 680 specifies that if the data is being received on SubsAlink-In at an aggregate bandwidth less than 1 Mbps and a sustained bandwidth of less than 500 Kbps, the data has to be re-transmitted with the type of service (TOS). Sustained bandwidth and aggregate bandwidth can be measured according to one of several known ways. The classifier specifies that the rule is applicable at any time of day and for all TOS. TOS, Time, Where and LineCond are examples of conditions for the policing service policy.

Service rule 680 decreases the priority of the data if the line conditions of service rule 680 are violated. As ISN 250 of the above-described embodiments regenerates data bit groups prior to sending on trunk ports 420, the TOS values can be decremented in a known way.

Using at least the above-described embodiments, particularized service policies can be provided to each subscriber by an ISP. As noted above, the invention has particular application for remote access application.

In addition, implementation of ISN 250 as an edge router enables simple devices to be deployed at the subscriber premises. As an illustration, without the present invention, a subscriber at network 210 of FIG. 2 may need to implement a complex router 220 to provide different service policies. The management overhead may be unacceptably high. In contrast, by using the present invention, the desired service policies can be provided by a central remote access provider using suitable configuration of ISN 250, thereby simplifying the configuration and management of devices at subscriber premises.

However, one requirement associated with internet service node is that the data related to the subscribers be assigned quickly and efficiently to specific processor(s) for processing so that a solution in accordance with the present invention can be used in environments with a large number of subscribers. Some problems associated with such assignment and solutions in accordance with the present invention are described below.

10. Problems with Assignment to Processors

As may be noted from the above description, switch fabric 440 may need to assign cells of an IP packets to a specific processor group 450. As switch fabric 440 may receive cells on different access ports and trunk ports, the assignment to a specific processor group 450 may need to occur quickly (in a short duration of time).

For quickness, the assignment may be based on the examination of cell headers. In the further description below, the assignment will be assumed to be based on VPI only. However, other parts of the cell header can be used in the assignment of the cells without departing from the scope and spirit of the present invention. When cells are received on access ports 410, the VPI number of the connections on which the cells are received may be controlled to correspond with an identifier of the specific processor group 450 as will be apparent to one skilled in the relevant arts.

However, when cells are received on trunk ports 420, multiple subscribers typically share the same ATM virtual connection. Subscriber data for different subscribers received on the same ATM connection may need to be assigned to different processors. In such situations, the data in the ATM cells may need to be examined for determination of the specific processor for processing the ATM cells.

In the case of IP networks, the IP destination address contained in the payload of the first ATM cell of an IP packet may need to be examined to determine the (subscriber) processor to assign the IP packet to. As is well known in the relevant arts, a sequence of cells represents an IP packet, and the first cell typically contains the IP destination address. Accordingly, it may be necessary to examine at least the IP header information when cell data is received from trunk ports 420.

The need to examine the cell data is not limited to cases when cells are received on trunk ports 420. The cell data may need to be examined when the cells are received on access ports 410 as well. For example, when cells relate to applications such as tunneling (e.g., L2TP and L2F) and IP security (typically containing data related to multiple subscribers on the same virtual circuit), the header data for higher layers (e.g., UDP. TCP) may need to be further examined to determine the specific processor for processing the cells.

Such a requirement is illustrated with reference to L2TP for conciseness. However, it should be understood that the present invention may be applied to several other applications. Using the present invention in the context of such applications is contemplated to be within the scope and spirit of the present invention.

In L2TP, all IP packets using a tunnel share the same IP destination address, that is, one of the IP addresses assigned to ISN 250. However, L2TP is generally implemented on top of UDP protocol type, and the UDP port number identifies that the IP packet relates to a L2TP tunnel. Further, the tunnel ID and call ID fields in the UDP packet may identify the specific subscriber to which an IP packet may relate to. The processor for processing may be determined based on the identity of the subscriber. Accordingly, it may be necessary to examine the higher layer protocol (UDP) headers or further information in the packet to determine the subscriber information.

To enable switch fabric 440 to assign the cells to one of the packet service cards 450 based on examination of the cell header, it may be desirable to substitute a different cell header (or other identification data) to enable switch fabric 440 to assign cells to a packet service card 450 identified by the cell header. Such substitution may be required in both the examples of above. The examination of higher layer protocols and substitution may need to be performed in real-time to avoid extensive buffering.

The present invention enables examination of cell headers and substitution using CAMs having masks for individual memory locations. The operation of CAMs with masks for individual memory locations is generally described first. The present invention is described then with examples.

11. CAMs with Masks for Individual Memory Locations

Figure 7A:
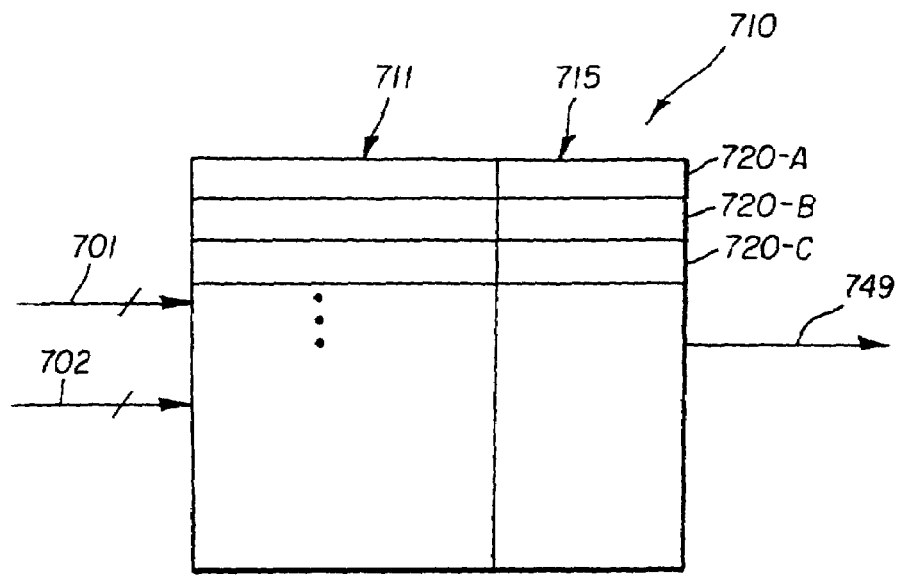
FIG. 7A is a block diagram illustrating the operation of a CAM with only one common mask for all memory locations.

To appreciate the efficiencies achieved by CAMs with masks for individual memory locations, the operation of conventional CAMs are first described with reference to FIG. 7A. FIG. 7A includes CAM 710 which generally provides for only one mask for access. CAM 710 is shown as having search field 711 and output data field 715 for each of CAM locations 720-A, 720-B, etc.

In operation, an input value and mask are respectively received on value bus 701 and mask bus 702. Each of the input value and mask has a number of bits equal to the search field length (number of bits in search field 711). The data stored in output field 715 is generated as output on output bus 749 if the input value at bit positions specified by mask bus 702 match (or equal) the corresponding bits of search field 711. That is, only the bits in bit positions specified by mask 702 may be compared.

Thus, if different bit positions need to be matched in different memory locations 720 of CAM 710, a corresponding number of multiple accesses (each with a different mask) may need to be performed.

It should be appreciated that the IP header (including UDP/TCP/ICMP information) data identifying each subscriber may be stored in each of the locations 720, and IP header data in a received first cell of an IP packet may be provided as value 701. However, as the bit positions to be examined differ for different situations (e.g., when differentiation is based on IP destination address only, the IP destination address need to be examined; and the IP destination address, protocol type, UDP port number, tunnel ID and port ID may need to be examined for L2TP), different mask values may need to be provided on mask bus 702.

That is, multiple CAM accesses may need to be performed, with each access having a corresponding mask representing the bit positions to be examined for a subscriber match. Such multiple CAM accesses may consume undesirably long duration of time, and may thus be undesirable.

An alternative embodiment may use multiple units of CAM 710, with each CAM serving subscribers with a specific mask. However, multiple CAMs may be undesirable at least due to cost considerations. A single CAM with masks for individual CAM locations may be used which avoids the need for multiple accesses as described below.

Figure 7B:
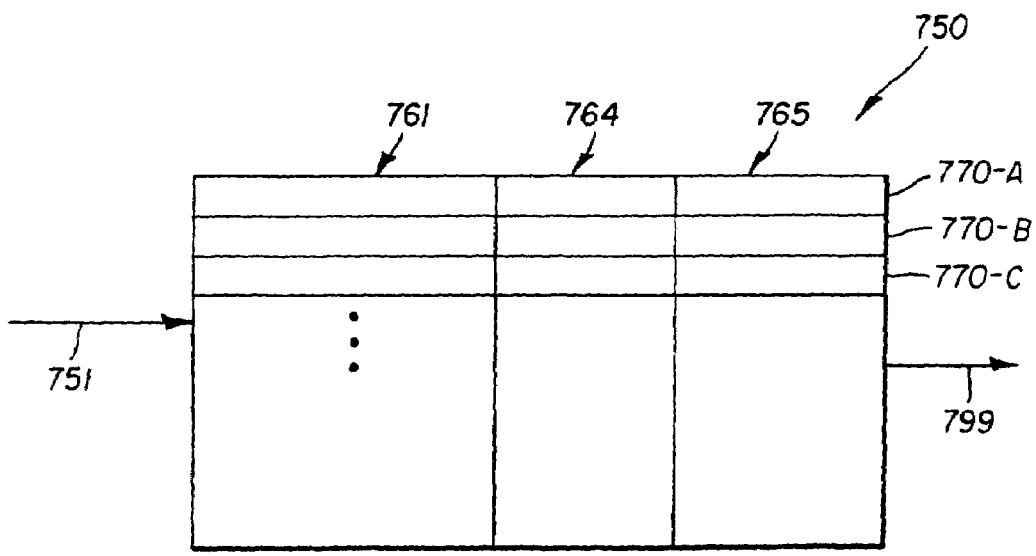
FIG. 7B is a block diagram illustrating the operation of a CAM with a mask for each memory location.

FIG. 7B is a block diagram of CAM 750 having multiple locations (770-A. 770-B and 770-C). CAM 750 may include input bus 751, search field 761, output field 765 and output bus 799, akin respectively to input bus 701, search field 711, output field 715 and output bus 749 of FIG. 7A. In addition, CAM 750 includes mask field 764, which stores a mask associated with individual locations 770. Therefore, instead of a common mask for all locations, an individual mask may be associated with each location of CAM 750.

In operation, when an input value (input bits) is provided on input bus 751, only the bit positions of each CAM location specified by the corresponding mask are compared with the input bits, and the output value in output field 765 for a matched location is provided on output bus 799. The output value may identify (either directly or indirectly) the processor to which the cell (or packet) may be assigned to for further processing.

Thus, different masks can be used for different locations. Each mask specifies the bit positions to be compared. The bit positions in turn are determined by the specific fields to be compared in the determination of a processor for processing cells as illustrated below.

12. Illustration with Reference to IP Environment

This section provides illustrations with reference to determining the subscriber (and thus the processor for processing) in two example scenarios: (1) When IP destination address uniquely identifies the subscriber, and (2) for L2TP. In the description of this section, the manner in which IP packets can be identified with a corresponding subscriber is described first. The manner in which such identification can be used for assignment of cells in an example embodiment is then described.

In general, it should be understood that the bit positions to be identified depends on the specific format used by the protocols. Information on IP and L2TP can be found in Request for Comments (RFCs) 768, 791 and 1483, which are all incorporated in their entirety into the present application herewith.

As to the example scenario 1, to determine a matching destination IP address in version 4.0 of the Internet Protocol, the following bit positions (expressed in terms of byte boundaries, with each byte containing 8 bits) may need to be examined to determine the following relationships:

Byte 1: IP version number=4; and header length=20 bytes; and

Bytes 17–20: Destination IP address of the received packet=IP address assigned to the specific subscriber.

Similarly, when subscriber data is received using L2TP, the following bit positions may need to be examined (i.e., unmasked in mask) to identify a subscriber (to whom the IP packet relates to) and thus the processor:

Byte 1: Same purpose as above

Byte 10: Protocol type=UDP

Bytes 17–20: Destination IP address of the received packet=IP address of an interface of ISN 250

The below bytes are examined assuming a IP header length of 20 bytes

Bytes 23–24: Destination UDP port number=Port number of L2TP protocol

Bytes 29–30: L2TP version, length and header information

Bytes 31–32: If length is not present, Tunnel ID assigned to the subscriber=tunnel ID specified by the received IP packet Bytes 33–34: If length is present, Tunnel ID assigned to the subscriber=tunnel ID specified by the received IP packet Bytes 35–36: Call ID of the received packet=Call ID assigned to the specific subscriber.

Thus, in general, each search may require examination of some bit positions which identify the packet format, version number and application type (e.g., L2TP), and some other bit positions which are specific to a subscriber (e.g., call ID and/or tunnel ID for L2TP case and destination IP address in the first example above). When all the bit positions match, a received IP packet may correspond to the subscriber associated with the matched location.

Continuing with reference to FIG. 7B, one CAM location may be allocated for each search. For example, CAM location 770-A may be allocated for a search of the type of Example 1 above, and CAM location 770-B may be allocated for a search of the type of Example 2 above. Mask field 764 for CAM location 770-A may have bit positions corresponding to bytes 1, 17 and 18 unmasked (set to 0), and the remaining bits may be masked (set to 1). Search field 761 of CAM location 770-A may contain data identifying the IP protocol version number, length, and the IP address identifying a subscriber system in the corresponding bit positions.

The contents of CAM location 770-B may be similarly described. The bit positions according to the bytes noted above may be unmasked. Search field 761 may be set with appropriate values in the corresponding positions, with the tunnel ID and/or call ID uniquely identifying a subscriber.

Multiple entries may be required for determining a subscriber if more than one protocol format needs to be supported. For example, in example 2 of above, one entry may need to be implemented for examining bytes 31 and 32 if length field is not present, and another entry may need to be implemented for examining bytes 33 and 34 if length field is present. Similarly, more entries may need to be implemented if a different version of IP protocol (e.g., IP version 6) can potentially be used by a subscriber. In general, the entries in CAM 750 define a search tree, with each leaf identifying a subscriber. Multiple leafs may identify the same subscriber.

Once the header data (for IP and higher protocol data) is provided as input on input bus 751, the data stored in the output field 765 is provided as an output on output bus 799. As should be appreciated, data identifying multiple subscribers may be stored in locations 770, and a match is detected in a single access.

However, the width of the search field (and thus of mask and inputs) may need to be at least 40 bytes (320 bits) to examine the IP header and higher layers information completely. Often, commercial embodiments of CAMs with masks for individual locations are of less width. At least to address the width problem, some optimizations described below may be employed.

13. Optimizations

In an embodiment, only bytes 1, 7, 8, 10, 13–15, 17–20, 23, 24, and 27–36 of the IP packet are examined assuming an IP header of 20 bytes and version 4 of IP. However, different bit positions may be searched depending on the specific application as will be apparent to one skilled in the relevant arts based on the description provided herein. Such searches are also contemplated to be within the scope and spirit of the present invention.

The bytes noted above contain the information for applications such as L2TP, L2F. IPSEC well known in the relevant arts. By avoiding the other bytes in the search process, the required CAM width is minimized to 24 bytes (192 bits). However, it may be a requirement to operate with CAMs of smaller width. In an embodiment described below, a CAM providing for only 112 bits (14 bytes) in search field 761 may be provided.

In such a case, a search may be split into a sequence of searches, with subsequent searches being performed only upon a match of the previous searches in the sequence. A match of all the searches in the sequences indicates that the received IP packet relates to a subscriber to which the sequence of searches relate to, and a processor specified by the CAM output is used to process the IP packet.

Operation with CAMs of inadequate width is described with reference to L2TP below. The CAMs may be implemented with in the access ports 410 and trunk ports 420. For illustration, implementation in trunk port 420 is described below.

14. Trunk Port

Figure 8:
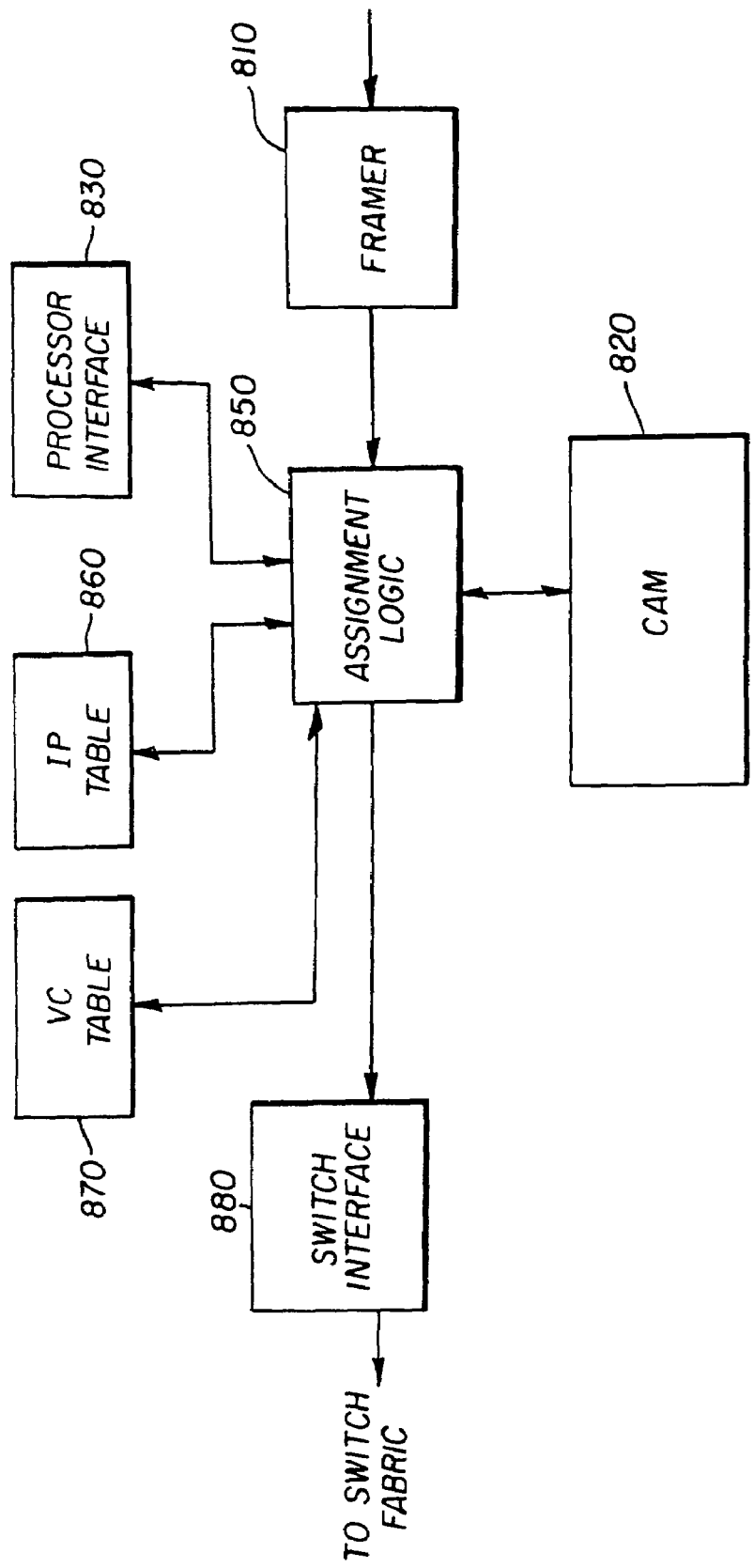
FIG. 8 is a block diagram illustrating a circuit which determines the processor for processing an IP packet in an embodiment of the present invention.

FIG. 8 is a block diagram illustrating the implementation and operation of a circuit in accordance with the present invention. Framer 810 may provide the electrical interface when receiving the subscriber data. Framer 810 may assemble bytes from the received bits, and provide the assembled bytes to assignment logic 850. The bytes constitute cell data. Switch interface 880 receives cell data from assignment logic 850 and forwards the received data to packet service card 450. Framer 810 and switch interface 880 may be implemented in a known way.

IP table 860 enables the assignment of IP packets to processors based on the source or destination IP addresses. Specifically, by using IP table 860, the present invention may minimize the number of CAM locations required for supporting multiple subscribers. The CAM lookup may be used to first generate an index, and the data in table 860 may be used for a further determination of the specific processor group to which to assign the IP packet.

Processor interface 830 may interface with RMC 460, and configure CAM 820 to enable the data related to each subscriber to be assigned to a specific processor group in accordance with the present invention. Processor interface 830 may further configure IP table 860 and VC table 870 under the control of RMC 460. As related to L2TP type protocols, processor interface 830 may receive tunnel related data (e.g., call ID, tunnel ID and corresponding processor information) from RMC 460 and configure CAM 820 to assign IP packets related to a subscriber to a specific processor group. CAM 820, VC-table 870, and IP table 860 may be shared by all access ports and trunk ports in ISN 250.

VC-table 870 may store data representing a mapping of the VPI/VCI header information in an ATM cell to a unique connection identifier. Thus, VC-table 810 returns the connection identifier in response to receiving VPI/VCI header data. IP table 860 and VC-table 870 may be implemented using fast memories such as SRAMs.

CAM 820 may be similar to CAM 750 of FIG. 7B and includes masks per CAM location. The masks and search fields are configured such that a matching entry can be identified quickly. The manner in which CAM 820 may need to be configured will be clearer from the below description.

The output of CAM 820 may represent an identifier. The identifier may either directly represent a processor or a processor group, or may serve as an index for a further search. In the embodiments described herein, the identifier represents a processor group or an index into IP table 860. The output of CAM 820 may also specify whether the output is to be interpreted as an index or as an index for a further search.

Assignment logic 850 receives each IP packet in the form of a sequence of cells, and determines the processor group on which to process the IP packet. To make such a determination, assignment logic 850 selects the relevant bytes of the header (IP header and upper protocol headers as requires), typically from the first cell of a sequence of cells forming an IP packet. The selected bytes are provided as an input to CAM 820. The output of CAM 820 represents an identifier as noted above.

In an embodiment, the cell header is modified for all the sequence of cells forming an IP packet, with the modified header identifying the processor (group) on which to process the IP packet. An example embodiment of packet service card 450 using the modified cell header to assign to the identified processor (group) is described below in further detail with reference to FIGS. 9 and 10. The Figures further illustrate the use of multiple CAM searches when the length of the search field of the CAM is not long enough.

15. Method

Figure 9:
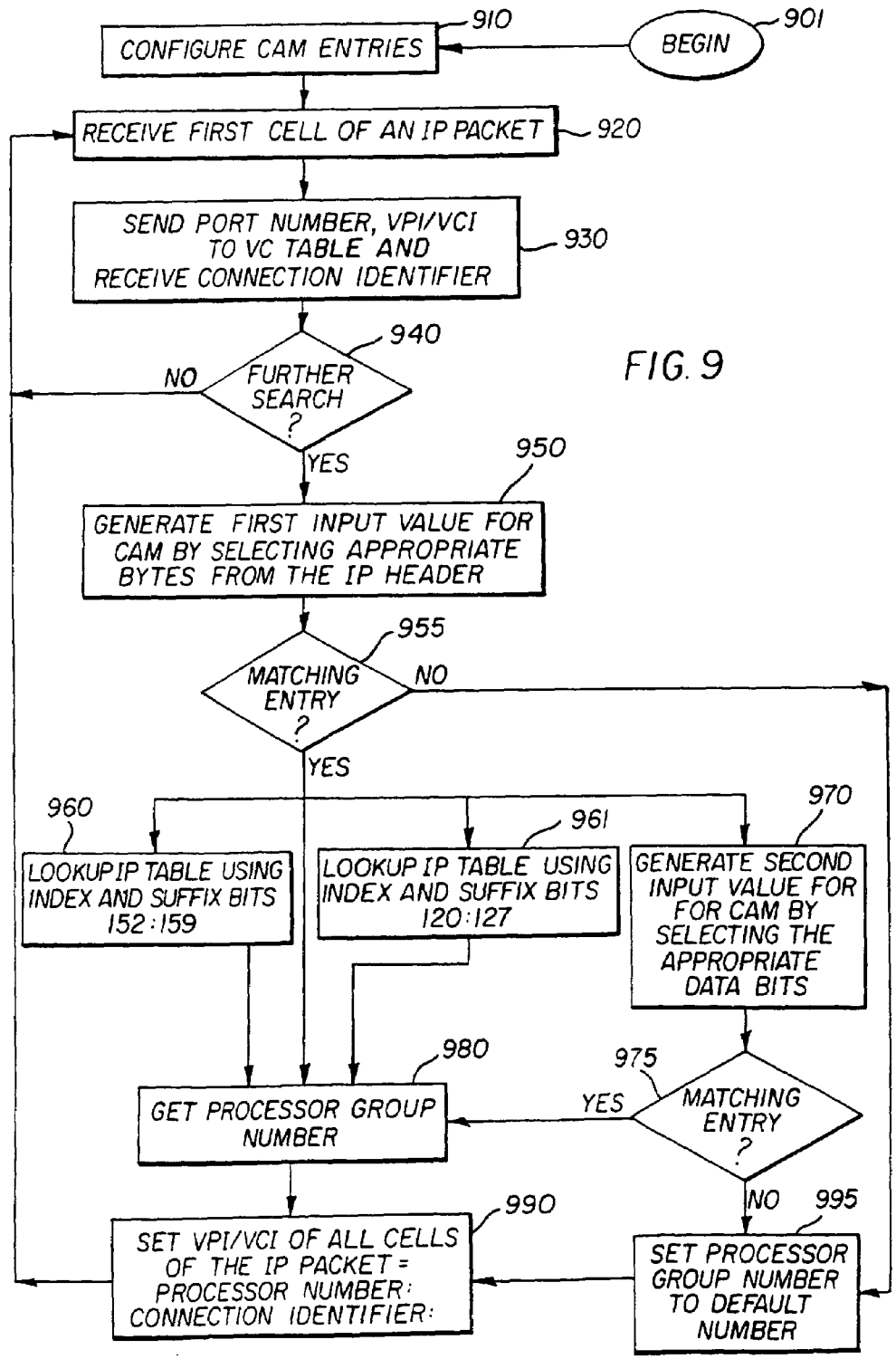
FIG. 9 is a flow-chart illustrating the steps performed to determine the processor identifier for different applications in an embodiment of the present invention.

FIG. 9 depicts a flow-chart illustrating the manner in which IP packets related to a subscriber can be assigned to a processor(s) in accordance with the present invention. In step 910, the masks and search fields in each of the CAM locations are configured, with the masks specifying the bit positions to be examined, and the search fields specifying the specific values (from the packet header) which identify a subscriber. As noted above, RMC 460 and processor interface 830 may perform such configuration in an embodiment. Typical considerations in some example scenarios are described below.

Some of the entries of CAM 820 may be configured dynamically when ISN 250 is operational and processing the subscriber data. For example, when a subscriber establishes a connection by dialing-in over a telephone line and is assigned a new IP address, an entry may be established based on IP destination address.

Some other entries of CAM 820 may be configured statically. For example, when multiple subscribers share the same ATM virtual connection and are connected to the same access port, and if the IP address(es) used by each subscriber are known, a CAM entry may be configured for examination of the source IP address.

In an embodiment, a single entry may be used for each subscriber, uniquely identifiable by a single (source or destination) IP address. One problem with using an entry for each such subscriber is that an unreasonably large number of locations may be required in CAM 820. The large location requirement may be a problem at least in ISP environments in which each subscriber may be assigned a unique address upon dialing into the ISP network. The present invention can be used to minimize the number of locations required in CAM 820 as described below in further detail.

Instead of assigning a single location for each IP address, a single location may be allocated for a group of IP addresses. The processor for processing the IP packet may be determined in combination with the entries stored in IP table 860. For example, the first three bytes of the IP address may identify the group, and the output of CAM 820 may serve as an index to a base address of IP table 860. The last byte of the IP address may serve as the offset from the base address, and the location in IP table 860 at the offset may contain the processor number.

When a single CAM location contains an index for a group of IP addresses, the mask for the CAM location may be chosen to reflect the grouping. For example, the first three bytes of an IP address may represent a group, and a mask of 00.00.00.ff may be chosen. Therefore, the CAM search provides an index to the first of the 256 (or 254 to account of subnet broadcasts) addresses, and IP table 860 may be accessed to determine the processor for processing a received IP packet. The retrieval of the processor identifier from IP table 860 is described below (with reference to step 960 and 961) in further detail.

In the case of tunneling, as noted above, the IP version number, header length, IP protocol type (i.e., for UDP), IP destination address, UDP destination port number. L2TP version number, tunnel ID and call ID may be examined to determine the processor for processing an IP packet. The necessary information generated during tunnel and call set-up may be provided by RMC 460 as noted above, and CAM 820 may be configured with the appropriate mask and search field.

In some situations, multiple subscribers may share the same tunnel. In such a situation, each subscriber may be uniquely identified by the IP addresses. To minimize the CAM lookups, all the packets for a tunnel may be assigned to a single packet service card 450, and the processors in the assigned packet service card 450 may differentiate between different subscribers by the examination of IP addresses encoded within the tunnel data.

In step 920, the first cell ("header cell") of a sequence of cells forming an IP packet may be received. The last cell of an IP packet may be determined according to AAL5 ATM standard well known in the relevant arts, and a subsequent cell may be deemed to be the first cell of the IP packet.

In step 930, assignment logic 850 may send the port number on which the cell was received, VPI and VCI of the received cell to VC-table 870, and receive a connection identifier and data indicating whether further search is required. Further search is typically required if the assignment to a processor (group) requires further examination of the IP packet formed by the cells.

Typically, a data bit retrieved from VC-table 870 indicates whether further search is required. If no search is required, the header of the cells of the IP packet may not be altered and be passed to switch interface 880. Control may then pass to step 920 if further search is not required and to step 950 if further search is required.

In step 950, assignment logic 850 may construct a first input value for CAM 820 by selecting some of the bytes from the cells forming an IP packet. The bytes need to be selected consistent with the search fields and masks used in the storage in step 910. Typically, the first cell includes all the data required to construct the input value.

In an embodiment, ISN 250 may support both LLC/SNAP and VC Mux. In general, VC Mux may be setup for a single protocol (IP version 4 in the example here), and LLC/SNAP includes a byte which specifies the Ethertype field. The Ethertype field may specify IP version 4 or 6, or other protocols common in the Ethernet type environments. Only the details of LLC/SNAP and VC Mux as applicable to the present invention are provided here. For a further description of the two protocols, the reader is referred to RFC 1483, which is incorporated in its entirety herewith.

To accommodate both LLC/SNAP and VC Mux protocols, an embodiment of assignment logic 850 may include the following bytes in the first input value:

Bytes 1 and 2 (of the first input value): Ethertype field of LLC/SNAP or don't care in the case of VC Mux Byte 3: Byte 1 of IP header Bytes 4–5: Bytes 7 and 8 of IP header Byte 6: Byte 10 of IP header Bytes 7–9: Bytes 13–15 of IP header Bytes 10–13: Bytes 17–20 of IP header Byte 14: Search type field described below Search type field may specify different types of searches being performed on CAM 820. For example, the field may specify whether it is a first search (i.e., step 950) or a second search (i.e., step 970 described below). The field may further specify whether the input IP packet is received on a LLC/SNAP type virtual connection or VC Mux type virtual connection. It may be noted again that the search fields in each of the CAM locations need to be stored consistent with the format for the input values. Typically, the type field for the second search onwards may be formed from the output of previous search.

Again, data in search field 761 needs to be stored consistent with the format (i.e., selected bytes and the sequence in which presented to CAM) of the input values. The format of the input field in an example scenario is noted above.

The output of CAM 820 may be examined in step 955 to determine whether a matching entry exists. If no match is detected, control passes to step 995 where a default processor group may be chosen to process the IP packet. In case of a match, control passes to one of steps 960, 961, 970 and 980 depending on the output of CAM 820 as described below.

The output data of CAM 820 identifies the processor (group) either directly or indirectly. The data itself may contain a processor identifier in the case of direct identification. In the case of indirect identification, additional searches are typically required. To specify whether the CAM output contains the processor identifier or not, a flag may be included in the output. The flag identifies the manner in which the processor can be determined further.

If the flag has a first value (for example, 1), the search for the matched entry corresponds to a group of subscribers, who are being identified by destination IP addresses. Therefore, in step 960, an entry with address of [pre-specified base address identified by the retrieved Index+the last byte of the IP destination address in the received IP packet] in IP table 860 may be retrieved. The retrieved entry may contain the processor (group) identifier.

If the flag has a second value, the search for the matched entry corresponds to a group of subscribers, who are identified by source IP addresses. Control then passes to step 961. Step 961 is performed similar to step 960, except that the last byte of the source IP address (i.e., bits 120:127) is used as an offset from the base address identified by the retrieved index. Control passes to step 980 from both steps 960 and 961, where the processor identifier is selected from the result of the access from IP table 860.

If the flag has a third value, the result of the search for the CAM search of step 950 contains the processor identifier. This may be the case, for example, when IP packets requiring a specific specialized service have to be assigned to a specialized processor. Another example is when a received IP packet relates to a routing protocol such as OSPF. The CAM entries may need to be configured consistent with such matching requirements in step 910.

If the flag has a fourth value, control passes to step 975, in which case a further search of CAM 820 may be required to determine the processor (group) identifier. These further searches may be required in cases such as, L2TP, L2F, IP Sec, as will apparent to one skilled in the relevant arts. As noted above, the second level of search may be required due to the limited number of bits (e.g., 112) available in the search field of CAMs with masks. Should CAMs contain sufficient number of bits in the search field, the multiple levels can be avoided for more throughput performance.

In an embodiment, the second input value for CAM 820 may have the following format assuming a 20 byte IP header:

Byte 1–2 (of the second input value): Bytes 23 and 24 representing the UDP destination port number Bytes 3–13: Bytes 27–37 of the received cell Byte 14: Search type The search type may specify that the present search represents a second search, which may avoid any inadvertent matches. In an embodiment, the search type of the second search may be formed from the bits of the output of the first search. The format and the bytes chosen above suffice for searching for IP Sec, L2TP, L2F, and many other protocols as will be apparent to one skilled in the relevant arts based on the disclosure provided herein.

If there is a matching entry, the CAM output may contain the processor group identifier and control passes to step 980. In step 980, the appropriate bits in the output may be selected for the processor group identifier. If no matching entry exists, control passes to step 995, in which a default processor identifier is chosen. All unmatched IP packets may be sent to a default processor.

Thus, a processor group identifier is determined at the end of steps 980 and 995. Control then passes to step 990, which illustrates an example approach for ensuring that the identified processor group executes the IP packet received in the form of multiple ATM cells.

In step 990, the VCI and VPI fields of all the ATM cells forming the IP packet are replaced respectively by the connection identifier and the processor identifier. The last cell of the IP packet may be determined according to AAL5 of the ATM standard as is well known in the relevant arts. Once the last cell is processed in step 990, control passes to step 920, where the first cell of a subsequent IP packet is examined.

Thus, the method of FIG. 9 illustrates an example approach of efficiently assigning the IP packet to a pre-designated processor group. The processor group may be identified by the VPI field as noted above in step 990. As described above, switch fabric 440 may forward the cells to the processor group identified by the VPI field. As the processor group contains the processing rules for the subscriber to which the cells relate to, the corresponding processing rules may be applied in processing the cells (or the IP packet formed from the cells).

Thus, by replacing the VPI/VCI fields of the ATM header, assignment logic 850 ensures that a packet received in the form of ATM cells is sent to the appropriate processor group. An embodiment of assignment logic 850 is described in further detail below.

16. Assignment Logic

Figure 10:
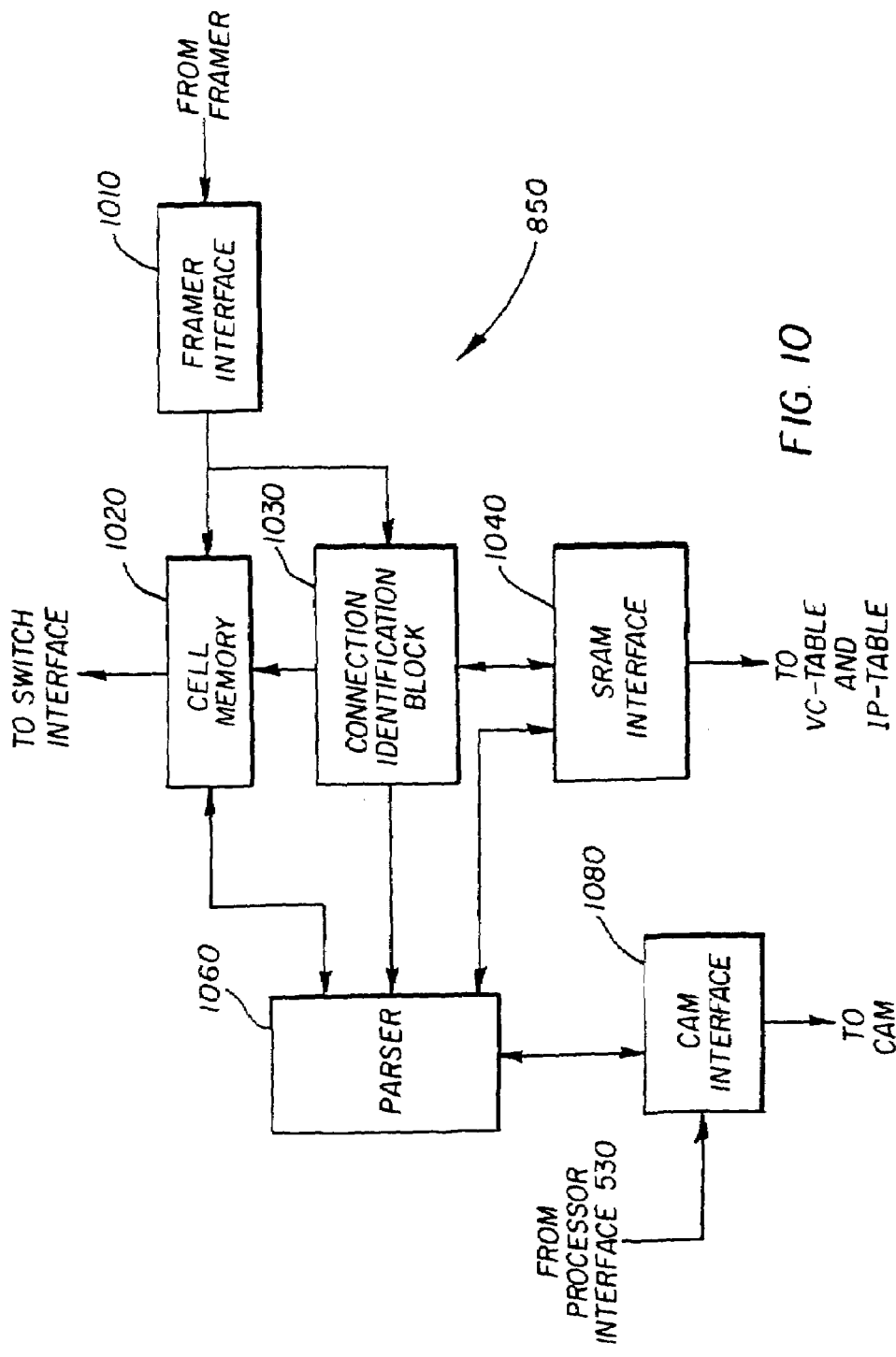
FIG. 10 is a block diagram illustrating the detail of an embodiment of assignment logic which modifies the cell header using the method of FIG. 9.

FIG. 10 is a block diagram illustrating the details of assignment logic 850 in one embodiment. Framer interface 1010 receives bytes from framer 810 and stores the received bytes in cell memory 1020. Connection identification block 1030 receives the header bytes, and sends the VPI/VCI data and port number to VC-table 870. Connection identification block 1030 receives a connection identifier from VC-table 870 if VC-table 870 is pre-configured with the data for the connection. If the connection data is not pre-specified, the cells may be sent to a specialized pre-designated processor group. Connection identification block 1030 may interface with VC-table 870 using SRAM interface 1040.

Parser 1060 may perform all steps of the flow-chart of FIG. 9 except step 910 by interfacing with other components. Parser 1060 receives the connection identifier from connection identification block 1030 and header data in the IP packet from cell memory 1020, and determines the processor group identifier. Parser 1060 may interface with CAM 820 through CAM interface 1080, and with IP table 860 through SRAM interface 1040.

Using the retrieved data, parser 1060 may determine the VPI/VCI of the cells when substitution is required. Parser 1060 may store the new values in cell memory 1020 to substitute the new VPI/VCI values. Cell memory 1020 may need to contain sufficient storage space to buffer cells for sufficient time while parser 1060 determines the new VPI/VCI data. The data from cell memory 1020 is sent to switch interface 880.

Thus, by replacing the VCI field of cells with the processor identifier, parser 1060 may enable switch fabric 440 to quickly forward cells to the appropriate processor group for processing the IP packets. In other words, switch fabric 440 may merely need to examine the cell header (a small number of bits) to assign the subscriber data to a specific processor (group). The processor group may in turn be configured to provide the service policies specific to the corresponding subscriber.

Even though the present invention is described as assigning data to different processor groups for providing different service policies, it will be apparent to implement the present invention in several other embodiments as will be apparent to one skilled in the relevant arts based on the disclosure provided herein. Such other embodiments are contemplated to be within the scope and spirit of the present invention.

It should be noted that the above described embodiment(s) of FIGS. 8–10 illustrate merely example approaches to implementing steps 140 and 150 of FIG. 1. Several other embodiments may be implemented without departing from the scope and spirit of the present invention as will be apparent to one skilled in the relevant arts based on the disclosure provided herein. Such other embodiments are also contemplated to be within the scope and spirit of the present invention.

17. CONCLUSION

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of providing a desired set of service policies to each of a plurality of subscribers, said method comprising:

identifying a plurality of processing rules which provide a set of service policies desired by each subscriber;

configuring an internet service node as an edge device of an access network with said processing rules corresponding to each of said subscribers and with said service policies being controlled from an edge of said access network;

receiving data in said internet service node;

determining in said internet service node a specific subscriber to whom said received data relates; and applying in said internet service node said plurality of processing rules related to said determined specific subscriber, wherein said applying is performed after said determining.

2. A method of providing a desired set of service policies to each of a plurality of subscribers, said method comprising:

identifying a plurality of processing rules which provide a set of service policies desired by each subscriber;

configuring an internet service node with said processing rules corresponding to each of said subscribers, said internet service node being an edge device;

receiving data in said internet service node;

determining in said internet service node a specific subscriber to whom said received data relates to; and applying in said internet service node said plurality of processing rules related to said determined specific subscriber.

3. The method of claim 2, wherein said applying of said plurality of processing rules in said internet service node is performed after determining said specific subscriber.

4. A method of providing a desired set of service policies to each of a plurality of subscribers, said method comprising:

identifying a plurality of processing rules which provide a set of service policies desired by each subscriber;

configuring an internet service node with said processing rules corresponding to each of said subscribers, said internet service node comprises a plurality of processors;

receiving data in said internet service node;

determining in said internet service node a specific subscriber to whom said received data relates to; and applying in said internet service node said plurality of processing rules related to said determined specific subscriber, wherein said determining and applying together comprises:

assigning each of said plurality of subscribers to a processor group, each processor group being configured with the processing rules corresponding to assigned subscribers; and forwarding data related to each subscriber to a corresponding processor group after said determining of specific subscriber.

5. The method of claim 4, wherein each processor group comprises a plurality of processors.

6. The method of claim 4, wherein data related to subscribers assigned to said processor group is assigned in a round-robin fashion among said plurality of processors.

7. The method of claim 4, wherein end systems of said plurality of subscribers generate data using internet protocol (IP).

8. The method of claim 7, wherein said data comprises ATM cells.

9. The method of claim 8, wherein said determining comprises examining data contained in said ATM cells, said determination of specific subscriber being based on the results of said examination and a port on which said ATM cells are received, wherein said port is comprised in said internet service node.

10. The method of claim 9, wherein said applying comprising:
deciding in said port the specific processor group to which said data is to be forwarded, wherein said specific processor group is decided based on said specific subscriber to whom said received data relates to; and
modifying the header of said cells to indicate said determined processor group such that the cells can be forwarded to an appropriate processor group based on examination of cell header, wherein said appropriate processor group is configured with the processing rules relate to said specific subscriber.

11. The method of claim 10, wherein said deciding is performed using a content addressable memory (CAM), said CAM containing a plurality of locations, each of said plurality of locations having a mask, a search field and an outfield field, said CAM being designed to receive an input value and compare said input value with data in said search field at bit positions specified by said mask for each of said plurality of locations, said CM being designed to generate as output the data stored in said output field if there is a match with the corresponding location.

12. The method of claim 11, wherein the data stored in the output field of said CAM identifies an identifier of a processor group either directly or indirectly, and wherein each entry of said mask and search field are implemented to store data identifying a subscriber such that said identifier can be determined using said data stored in said output field.

13. The method of claim 12, wherein a portion of the header of said ATM cells is replaced with said identifier such that said ATM cells can be assigned to a processor group designed to process data related to said subscriber by examining said header.

14. The method of claim 13, wherein said identifier is stored in a virtual path identifier (VPI) or virtual channel identifier (VCI) field of said header.

15. The method of claim 13, wherein a switch fabric forwards said data to said processor group based on an examination of said header of said ATM cells.

16. The method of claim 13, further comprising:
storing a mapping of virtual path identifier/virtual channel identifier (VPI/VCI) and port number to a connection identifier in a virtual channel (VC) table, wherein each entry of said VC table further indicates whether the VPI/VCI of a received cell needs to be replaced, and
accessing an entry in said VC table corresponding to a received cell composed in said received data,
wherein said header of said received cell is modified only if the data in said entry indicates that the VPI/VCI field is to be replaced.

17. The method of claim 16, further comprising:
setting the VCI cells forming said received data to said connection identifier;
generating a processor identifier or a processor group identifier using said output of said CAM; and
setting the VPI of said sequence of cells to said processor identifier or said processor group identifier;
wherein said switch fabric uses said VPI to forward said sequence of cells to one of said processors.

18. The method of claim 12, wherein bytes 1, 7, 8, 10, and 13-20 of an IP header are provided as said input to said CAM.

19. The method of claim 12, further comprising setting said mask of a location to examine at least some of the bit positions corresponding to an IP address, and said search field of said location to a plurality of IP addresses in combination with said mask, wherein at least some of said IP addresses are associated with said subscriber.

20. The method of claim 19, wherein each of said IP addresses comprises an IP source address.

21. The method of claim 19, wherein each of said IP addresses comprises an IP destination address.

22. The method of claim 19, further comprises:
maintaining an IP table mapping each of said plurality of IP addresses to a processor identifier or a processor group identifier; and
using bits in the masked positions of the IP address of said IP packet and said output of said CAM to retrieve said processor identifier or said processor group identifier, wherein said sequence of cells are assigned to a processor identified by said processor identifier or said processor group identifier by said processor group identifier.

23. The method of claim 12, wherein said search field does not contain sufficient number of bits to store data identifying said subscriber, said method further comprising:
storing in a plurality of entries of said CAM data identifying said subscriber, wherein the output of said plurality of entries is examined in determining said processor identifier or processor group identifier.

24. The method of claim 23, wherein the output of one said plurality of entries is used as an input to another one of said plurality of entries of said CAM, wherein the output of said another of said plurality of entries identifies said processor identifier or processor group identifier.

25. The method of claim 23, wherein received data related to said subscriber is received using an L2TP tunnel.

26. The method of claim 25, further comprises:
providing bytes 1, 7, 8, 10, 13–15, and 17–20 of the IP packet contained in a first cell of said received data as a first input; and
providing bytes 23, 24, and 27–37 of the IP packet contained in said first cell as a second input.

27. A method of providing a desired set of service policies to each of a plurality of subscribers, said method comprising:
(a) providing an internet service node (ISN) as an edge router;
(b) specifying a desired set of service policies for each of said plurality of subscribers;
(c) translating each of said desired service policies into processing rules, wherein each processing rule comprises a classifier and an associated action, wherein said classifier identifies data flows to which said associated action is to be applied;
(d) configuring said ISN with said processing rules;
(e) receiving a plurality of bit groups from a subscriber comprised in said plurality of subscribers;
(f) generating a plurality of packets from data contained in said plurality of bit groups, wherein each of said plurality of packets can be associated with a data flow generated by an application of said subscriber;
(g) determining a data flow to which each of said plurality of packets relates to; and
(h) applying said actions associated with classifiers matching said data flow determined in (g),
whereby each of said plurality of subscribers are provided said corresponding desired set of service policies.

28. The method of claim 27, wherein end systems of said plurality of subscribers generate data using internet protocol (IP) and (f) comprises generating a plurality of IP packets.

29. The method of claim 28, wherein said bit groups comprise ATM cells, and wherein said plurality of packets are generated from said ATM cells.

30. The method of claim 28, further comprising maintain a state for one of said plurality of service policies, wherein said state enables multiple data flows to be processed to meet the service.

31. The method of claim 28, further comprising maintaining a state for each of said data flows, wherein the processing rules to be applied to packets of each flow is maintained in said state.

32. The method of claim 28, further comprising:
(i) monitoring control data flow of an application to determine the port number of a new data flow by an application; and
(j) generating a new processing rule using the determined port number.

33. The method of claim 27, further comprising:
(k) providing a plurality of processor groups, with each processor group containing a plurality of processors; and
(l) assigning each of said packets to one of said plurality of processor groups, wherein one of said plurality of processors in said assigned groups processes the assigned packets.

34. The method of claim 33, wherein all packets related to a subscriber are assigned to a single processor group.

35. The method of claim 34, further comprising assigning packets to individual processors in a round-robin fashion.

36. An internet service node (ISN) providing a desired set of service policies to each of a plurality of subscribers, said ISN comprising:
identifying means for identifying a plurality of processing rules which provide a set of service policies desired by each subscriber;
configuration means for configuring an internet service node with said processing rules corresponding to each of said subscribers, said internet service node is provided as an edge device of an access network so said service policies call be controlled from an edge of said access network;
receiving means for receiving data in said internet service node;
determination means for determining in said internet service node a specific subscriber of the plurality of subscribers related to said received data; and
applying means for applying in said internet service node said plurality of processing rules related to said determine specific subscriber after said specific subscriber is determined.

37. The ISN of claim 36, wherein said ISN comprises a plurality of processors, said determination means and applying means together comprise:
assignment means for assigning each of said subscribers to a processor group, wherein each processor group is configured with the processing rules corresponding to the assigned subscribers; and
forwarding means for forwarding data related to each subscriber to a corresponding processor group after said determining of specific subscriber.

38. The ISN of claim 37, wherein end systems of said plurality of subscribers generate data using internet protocol (IP).

39. The ISN of claim 38, wherein said data comprises ATM cells.

40. The ISN of claim 39, wherein said assignment means comprises examination means for examining data contained in said ATM cells, said determination of specific subscriber being based on the results of said examination and a port on which said ATM cells are received, wherein said port is contained in said internet service node.

41. The ISN of claim 40, wherein said assignment means further comprises modifying means for modifying the header of said cells to indicate said determined processor group such that the cells can be forwarded to an appropriate processor group based on examination of cell header, wherein said appropriate processor group is configured with the processing rules related to said specific subscriber.

42. A method comprising:
specifying a service policy for a subscriber;
translating the service policy into processing rules, each of the processing rules including a classifier and an action, the classifier identifying a data flow, and the action implementing a policing service policy, the classifier including a time field to specify a time of day during which the policing service policy should be applied; and
processing incoming data in accordance with the processing rules.

43. The method of claim 42, wherein translating the service policy into processing rules comprises specifying a prioritization policy to prioritize available bandwidth as part of the policing service policy of each of the processing rules.

44. The method of claim 42, wherein translating the service policy into processing rules comprises specifying an allocation policy to allocate available bandwidth as part of the policing service policy of each of the processing rules.

* * * * *